United States Patent [19]

Herlin et al.

[11] Patent Number: 4,613,391

[45] Date of Patent: Sep. 23, 1986

[54] POLYHEDRON ASSEMBLING MACHINE AND METHOD

[75] Inventors: Robert M. Herlin, Jupiter, Fla.; Richard W. Sutton, Lyme, Conn.

[73] Assignee: Graphics 3 Inc., Jupiter, Fla.

[21] Appl. No.: 652,469

[22] Filed: Sep. 20, 1984

[51] Int. Cl.[4] .............................................. B32B 31/04

[52] U.S. Cl. .................................... 156/213; 156/227; 156/475; 493/89; 493/142; 493/162; 493/912

[58] Field of Search ........................ 156/213, 227, 475; 493/89, 90, 92, 162, 904, 912, 142

[56] References Cited

U.S. PATENT DOCUMENTS

| | | | |
|---|---|---|---|
| 600,344 | 3/1898 | Frost . | |
| 2,887,834 | 5/1959 | Guyer . | |
| 3,029,711 | 4/1962 | Griese . | |
| 3,461,642 | 8/1969 | Langen et al. . | |
| 4,157,058 | 6/1979 | Vogel . | |
| 4,235,159 | 11/1980 | Johnson et al. . | |
| 4,247,289 | 1/1981 | McCabe | 493/904 X |
| 4,303,405 | 12/1981 | Reichert | 493/92 |

*Primary Examiner*—Robert A. Dawson

*Attorney, Agent, or Firm*—Banner, Birch, McKie & Beckett

[57] ABSTRACT

A machine for assembling polyhedron devices comprising lifting means for lifting a polyhedron blank from a supply stack. Forming means receive the polyhedron blank from the lifting means and form the polyhedron into a polyhedron shaped article. A resilient member inserter means inserts a resilient member, such as a rubber band, into the polyhedron blank on the forming means so that the resilient member will bias the polyhedron shaped article into its formed configuration. Preferably the polyhedron assembling machine of the present invention further comprises adhesive applying means for applying adhesive to the polyhedron blank in the forming means. The machine of the present invention may further comprise a polyhedron blank holder means for holding a supply stack of polyhedron blanks to be lifted by the lifting means.

The invention also comprehends a method of making a collapsible polyhedron article.

35 Claims, 55 Drawing Figures

333
357
349a
348
335
347a
344
400
347
349
350
348
404
330
322
355
402

FIG. 15
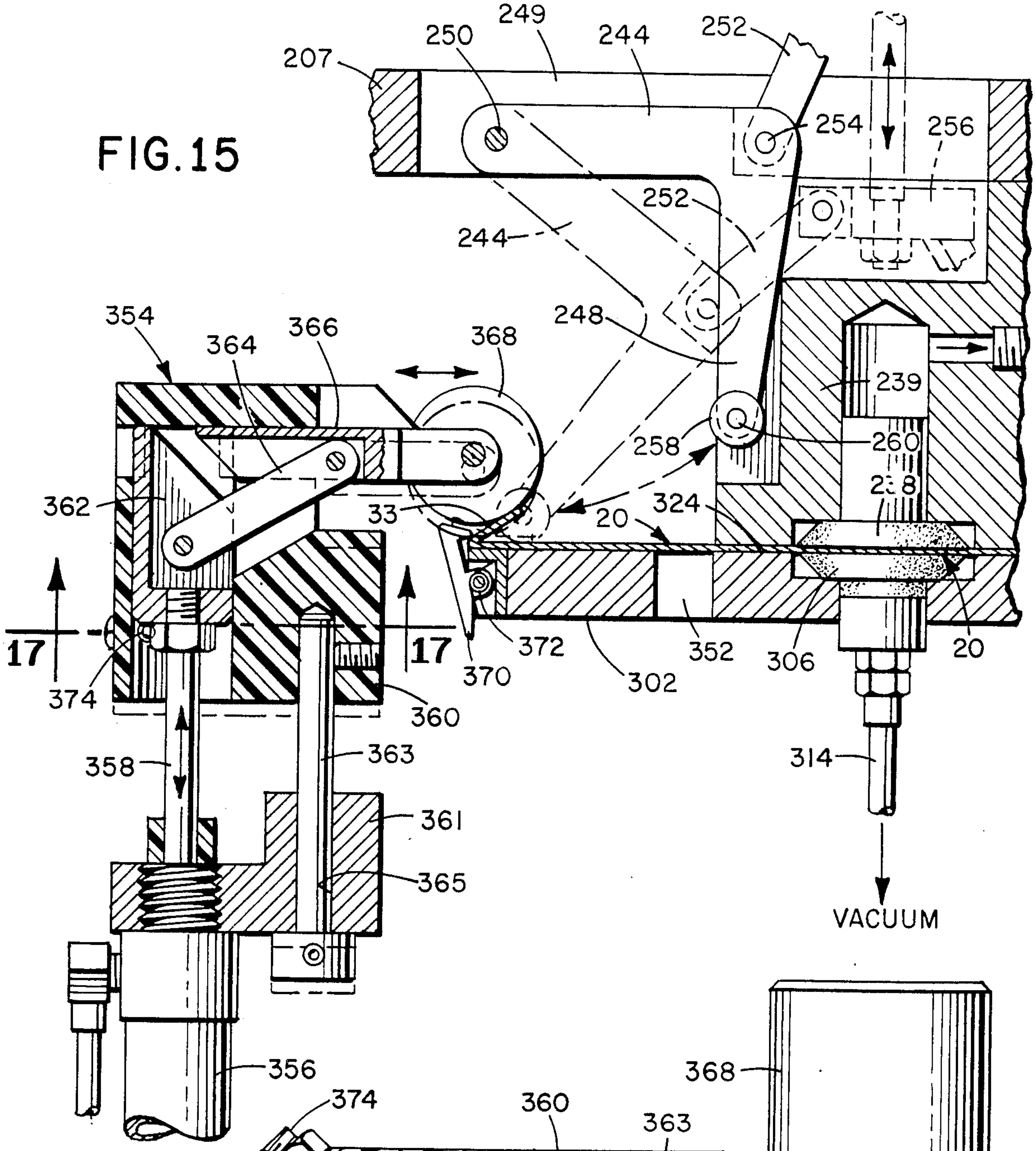
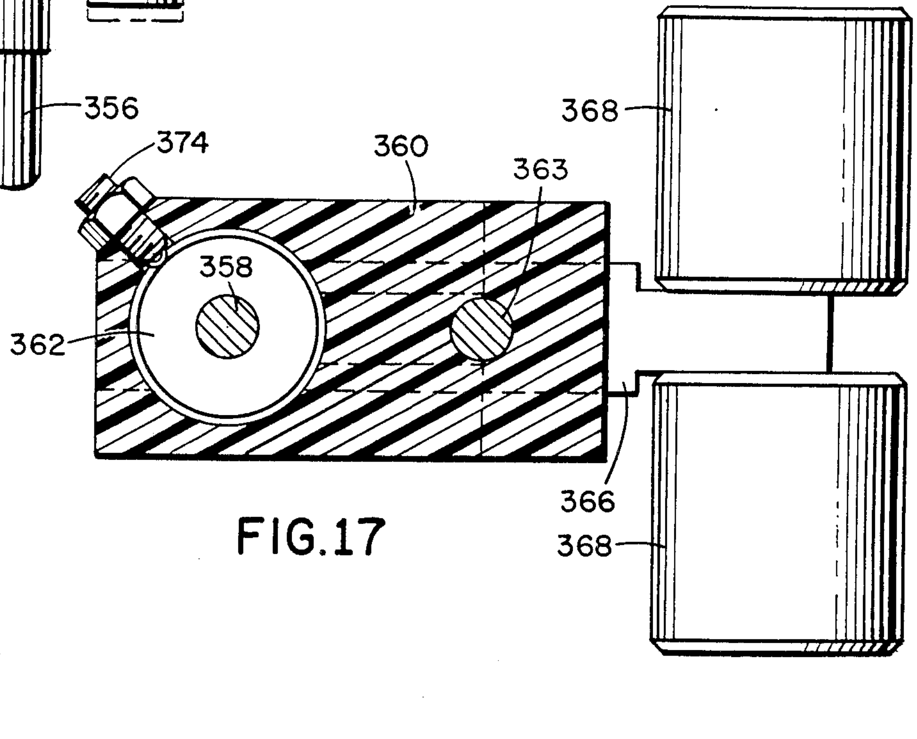
FIG. 17

FIG. 42
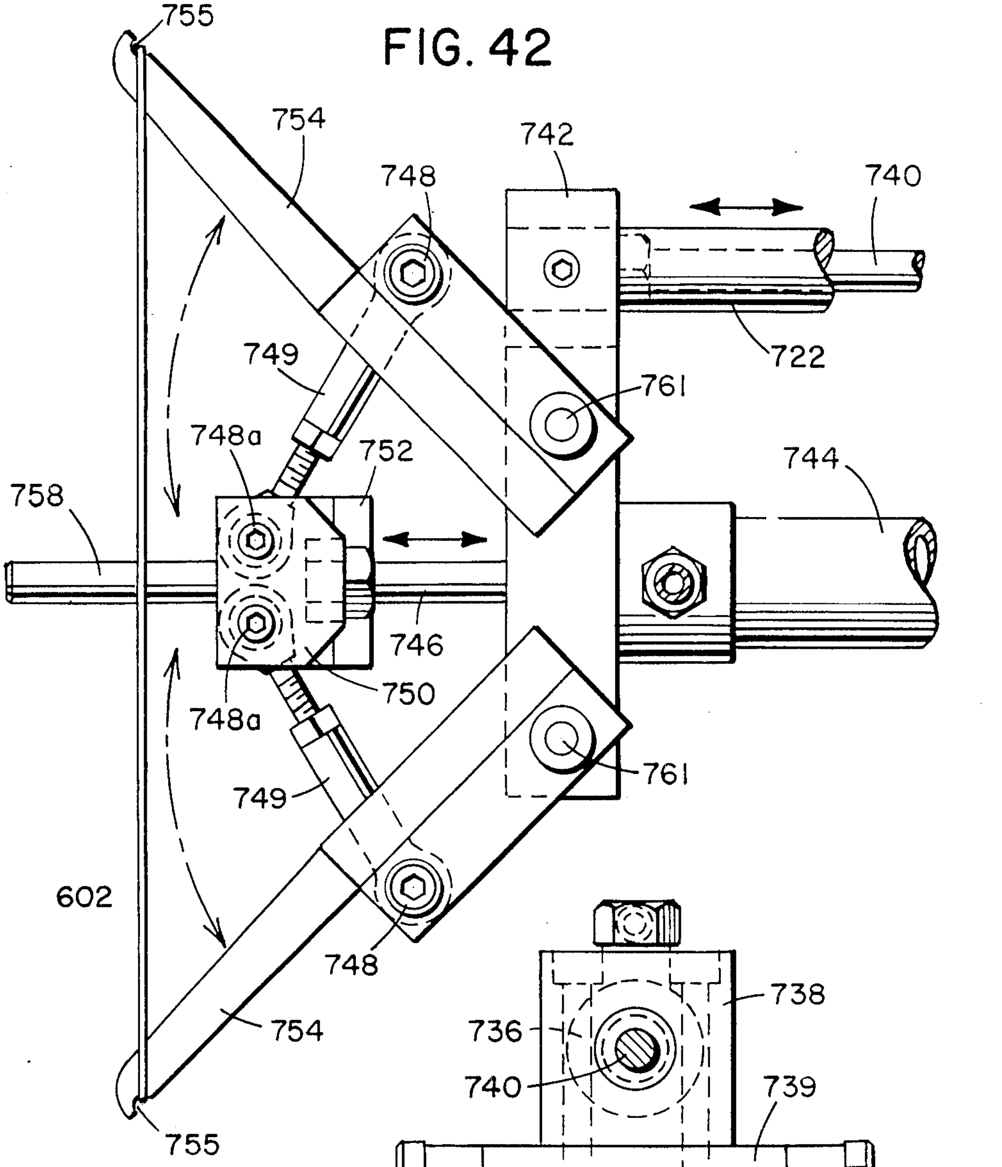
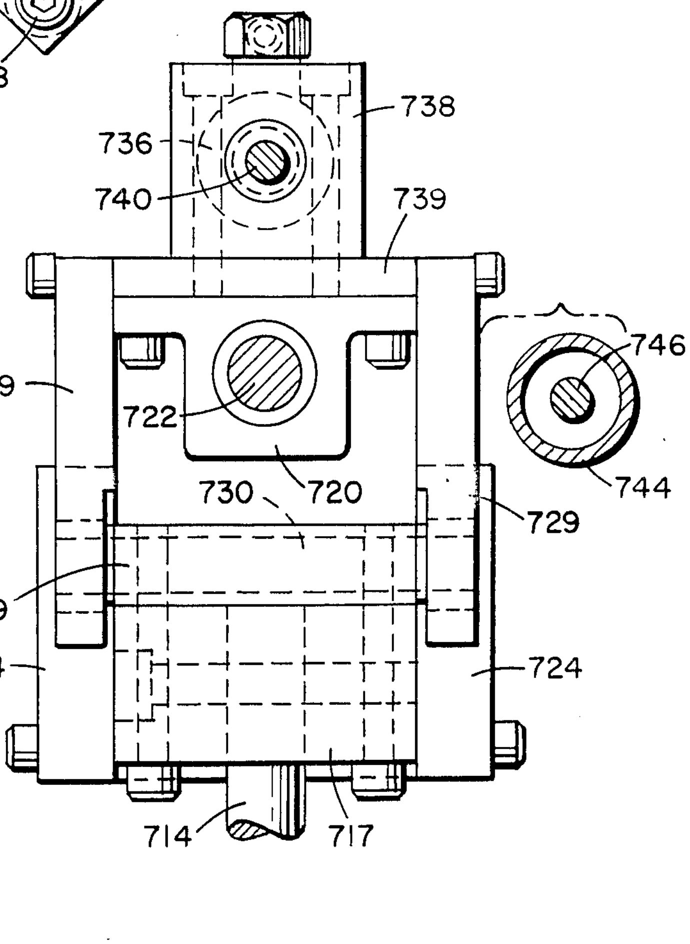
FIG. 40

| SEQUENCE | OPERATION |
|---|---|
| 95–27 | PLACEMENT HEAD VACUUM |
| 0–34 | PLACEMENT HEAD CYCLE – FROM MAGAZINE TO FORMING HEAD & RETURN |
| 0–10 | RUBBER BAND CONVEYOR MOVES RUBBER BAND TO PICK-UP POSITION |
| 0–11 | RUBBER BAND INSERTER EXTENSION NO. 1 – TO R.B. CONVEYOR & RETURN. |
| 5–26 | GLUE TROUGHS CYCLE UP-DOWN |
| 10–53 | R.B. INSERTER JAW CYCLE: OPEN TO CLOSE |
| 15–17 | FLAP FOLD-UP (6 PUSHERS 332 CYCLE UP-DOWN) |
| 19–21 | 6 FLAPS FLAT (6 FINGERS 244 CYCLE DOWN-UP) |
| 20–25 | TAB FOLDERS FOR FLAPS 21, 22, 23, 26 CYCLE UP-DOWN |
| 22–25 | FLAP FOLD-UP (4 PUSHERS 332 CYCLE UP-DOWN) |
| 26–28 | 4 FLAPS FLAT (4 FINGERS 242 CYCLE DOWN-UP) |
| 28–34 | TAB FOLDERS FOR FLAPS 27, 28, 29 CYCLE UP-DOWN |
| 27–75 | FORMING HEAD VACUUM |
| 30–61 | R.B. INSERTER ROTATION FROM R.B. CONV. TO FORMING HEAD & RETURN. |
| 31–61 | GLUE HEAD ROTATION FROM GLUE POT TO FORMING HEAD & RETURN. |
| 40–53 | R.B. INSERTER EXTENSION NO. 2 – INSERT R.B. IN SLOTS 42 & RETURN. |
| 50–54 | GLUE HEAD CYCLES DOWN-UP, APPLIES GLUE TO TABS. |
| 64–90 | FORMING HEAD CYCLES UP-DOWN. |
| 85 | COUNTER ACTUATED. |
| 90 | AIR JET EJECTS POLYHEDRON. |

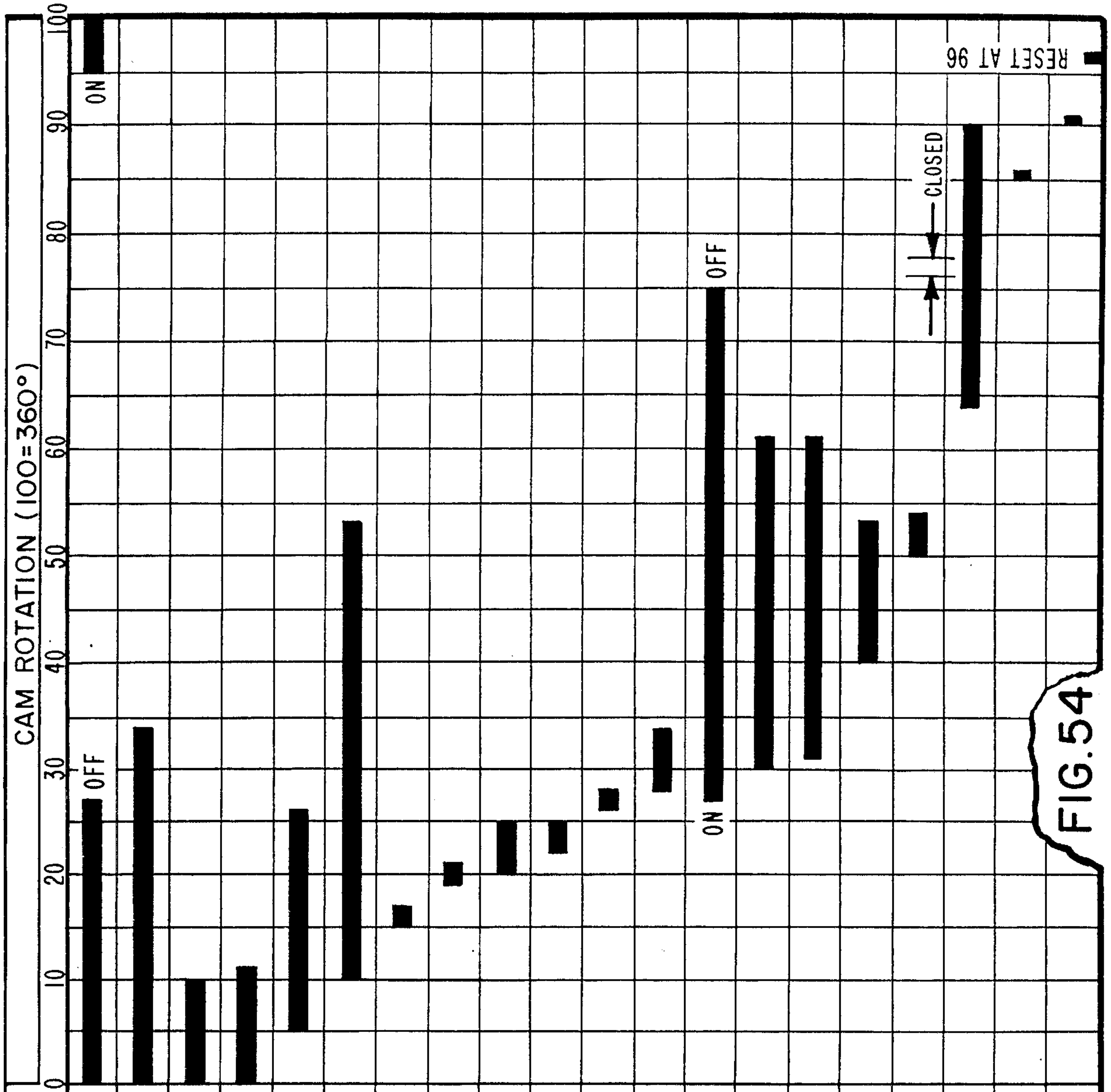

FIG. 54

POLYHEDRON ASSEMBLING MACHINE AND METHOD

BACKGROUND OF THE INVENTION

This invention relates to a machine for assembling a polyhedron and a method for making a collapsible polyhedron.

Polyhedron devices such as those disclosed in U.S. Pat. Nos. 2,797,512 and 600,344 are well-known and commonly used as decorative items or, as disclosed in the above cited patents, as desk calendars. The calendar in U.S. Pat. No. 2,797,512 is made from a plastic molded material, whereas the calendar in U.S. Pat. No. 600,344 is made from a single piece of cardboard or paper which is folded in the form of a pyramid.

Various machines for folding cardboard and paper into a specific shape are also well-known. For example, U.S. Pat. No. 3,029,711 discloses a method of making cartons in which a flexible strip is positioned between opposite panels of a carton. The strip is intended to prevent the walls of the carton from bulging outwardly. Griese discloses that his carton may be made with any suitable equipment, but he does not disclose any specific equipment for carrying out his invention.

U.S. Pat. No. 4,235,159, discloses a machine for inserting dividers into four panel cartons. The machine comprises a magazine and feeder mechanism, a tab forming mechanism, a divider insert mechanism, and a gluing system. The divider insert mechanism comprises "flexible fingers" which press the divider into its proper position. The machine disclosed in this patent, however, does not fold or form the carton into which the divider is inserted. U.S. Pat. Nos. 4,157,058, 3,461,642, 3,067,556, and 2,887,834 are each representative of conventional carton folding and gluing machines. All of these machines fold cartons into a conventional, rectangular cross-section.

Up until the development of the present invention, most paper polyhedron assemblies have been formed by hand. The present invention provides a machine and method which mechanically forms a polyhedron structure.

SUMMARY OF THE INVENTION

The polyhedron assembling machine of the present invention comprises lifting means for lifting a polyhedron blank from a supply stack. Forming means receive the polyhedron blank from the lifting means and form the polyhedron into a polyhedron shaped article. A resilient member inserter means inserts a resilient member, such as a rubber band, into the polyhedron blank on the forming means so that the resilient member will bias the polyhedron shaped article into its formed configuration. Preferably the polyhedron assembling machine of the present invention further comprises adhesive applying means for applying adhesive to the polyhedron blank in the forming means. The machine of the present invention may further comprise a polyhedron blank holder means for holding a supply stack of polyhedron blanks to be lifted by the lifting means.

Preferably the invention also comprises a resilient member, or elastic band, conveyor means for conveying a supply of elastic bands to the elastic band inserter means.

Preferably both the lifting means and the forming means further comprise pre-bending means for pre-bending the polyhedron blanks along score lines formed on the polyhedron blank.

In the preferred form of the invention, the lifting means comprises a pneumatically actuated pickup head. Preferably the pickup head is fixed to a hinge rod by a connecting arm rotatably attached to each end of the pickup head so that the pickup head can rotate relative to the hinge rod and relative to the connecting arm. A cam follower may be attached to one end of the pickup head. The cam follower engages a cam track which defines the rotational movement of the pickup head relative to both the hinge rod and the connecting arms.

Preferably the pre-bending means in both the lifting means and the forming means comprises a plurality of "fingers" which are actuated to bend the polyhedron blank along its score lines.

The forming means comprises a plurality of plates hingedly connected. The plates are rotatable about the hinge connection so that a polyhedron blank placed on the plates is formed into a polyhedron shaped article when the plates are rotated about the hinged connection.

Preferably the forming means comprises two plates. The hinged connection allows the plates to be rotated in two stages, ending in a contiguous configuration.

Preferably the forming fixture comprises retaining means, such as a suction element, for retaining the polyhedron blank in place during the forming process.

Preferably the two plates of the forming means are actuated to rotate about the hinged connection by a plurality of connecting arms. At least one of the connecting arms engages a cam track. The connecting arms may be pneumatically operated or operated by other means.

The resilient member will herinafter referred to generally as a rubber band, although it will be appreciated that other types of resilient members may be used also.

The rubber band conveyor means comprising a housing and at least two conveyor belts fixed within the housing for conveying rubber bands from one end of the housing to another end of the housing. Preferably the conveyor belts are spaced from each other over a portion of their length so that a rubber band is conveyed by the conveyor belts in an expanded configuration.

The rubber band inserter means preferably includes a rotatable body, a longitudinally extendable arm extending from the rotatable body and rotatable therewith, and two laterally movable arms attached to the longitudinally extendable arm, whereby the laterally movable arms may receiver a rubber band and insert it onto a polyhedron blank on the forming means.

The adhesive applying means comprises an adhesive applicator for applying adhesive to a polyhedron blank held on the forming means and an adhesive reservoir for supplying adhesive to the adhesive applicator. Preferably the adhesive applicator has a plurality of adhesive applying elements which receive adhesive from the adhesive reservoir and apply adhesive to a polyhedron blank. Preferably the adhesive reservoir comprises a plurality of movable adhesive troughs which receive adhesive from the adhesive reservoir. The adhesive appying elements dip into the troughs to receive their supply of adhesive. The adhesive applicator is rotatable between the adhesive reservoir and the forming means which holds a polyhedron blank.

Preferably, the polyhedron blank holder means comprises two tracks and a base member for holding a supply stack of polyhedron blanks. The base member has a central apperture through which the lifting means can withdraw a polyhedron blank from the supply stack of polyhedron blanks.

The invention also comprehends a method for making a collapsible polyhedron article. The method includes placing a flat polyhedron blank on a forming fixture having a hinged connection. Portions of the polyhedron blank receive a pre-bending operation along score lines prior to the step of bending the polyhedron to form the blank into its formed polyhedron configuration. Preferably the pre-bending comprises the steps of bending a flap of the polyhedron blank in a first direction, bending the element back to its original position, folding a tab on the polyhedron blank, and holding the adhesive flap in the folded position. A rubber band is conveyed to a rubber band insertor for inserting the rubber band into the polyhedron blank. The rubber band will serve to bias the polyhedron into its formed configuration. Adhesive is applied to the polyhedron blank so that one part of the blank will be adhesively connected to another part of the blank. The polyhedron blank is then folded by bending the forming fixture along its hinged connection to form the polyhedron blank into its formed polyhedron configuration.

BRIEF DESCRIPTION OF THE DRAWINGS

FIG. 15 is a section view of the tab folder and flap fold-down finger.

FIG. 17 is a sectional view taken along line 17—17 of FIG. 15.

FIGS. 39 through 41 are sectional views taken along their respective section lines on FIG. 38.

FIG. 42 is a bottom plan view of the rubber band inserter fingers shown in their expanded configuration.

FIG. 54 is a timing sequence chart of the operation of the present invention.

DESCRIPTION OF A PREFERRED EMBODIMENT

Figure 1:
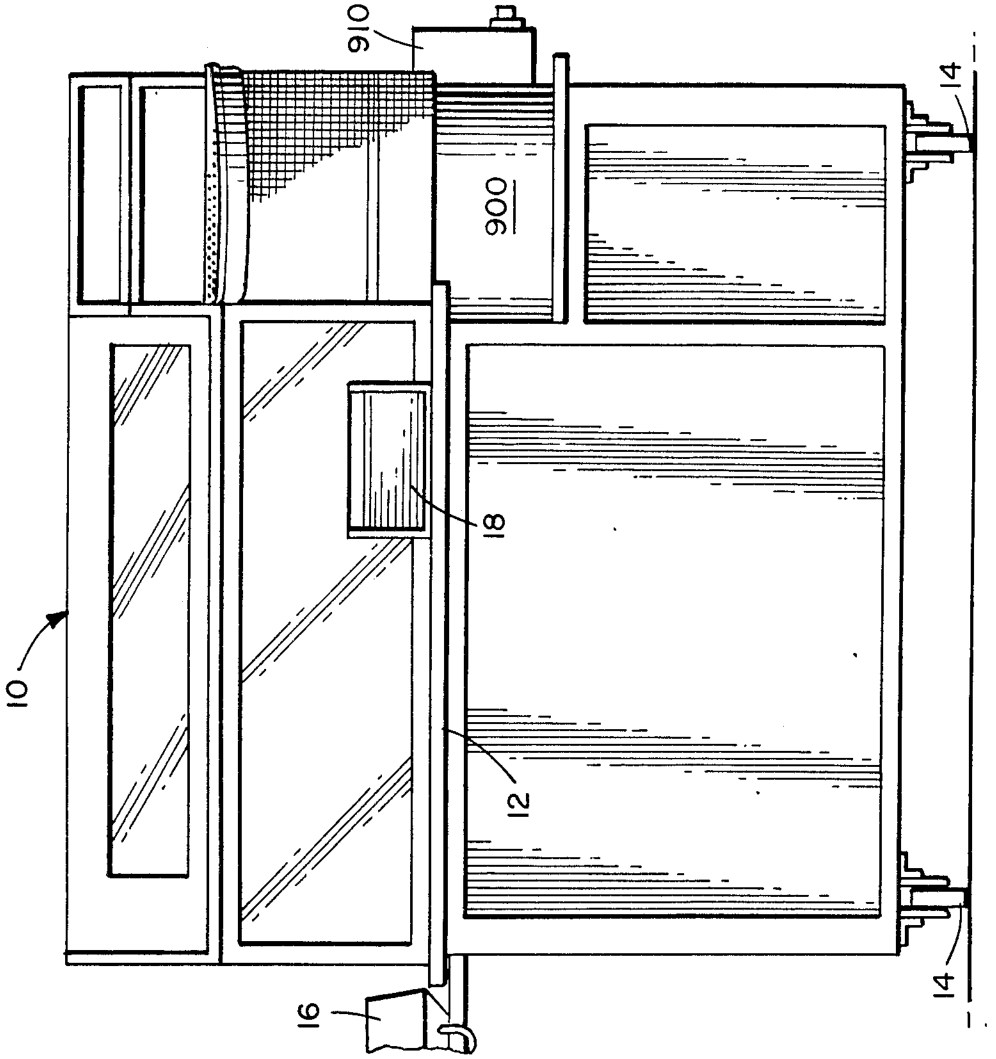
FIG. 1 is a front elevational view of a polyhedron assembly machine according to the present invention.

Referring specifically to FIG. 1, a polyhedron assembling machine according to the present invention is shown in its assembled operating configuration. The machine is intended to be generally contained within a housing shown generally at 10. The housing is supported on a table 12 and may be provided with wheels or other rolling elements 14 to permit it to be easily manuvered. Also shown in FIG. 1 is a glue pot 900 for applying adhesive to a polyhedron blank and the glue pot heat control mechanism 910.

Figure 2:
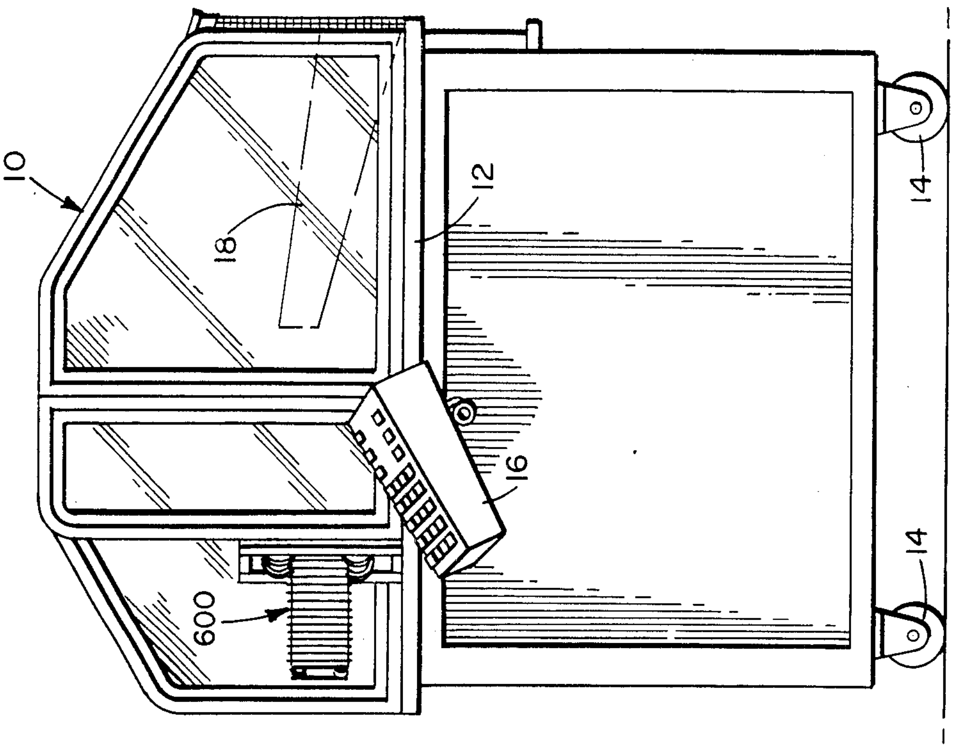
FIG. 2 is a side elevation of the machine shown in FIG. 1.
Figure 3:
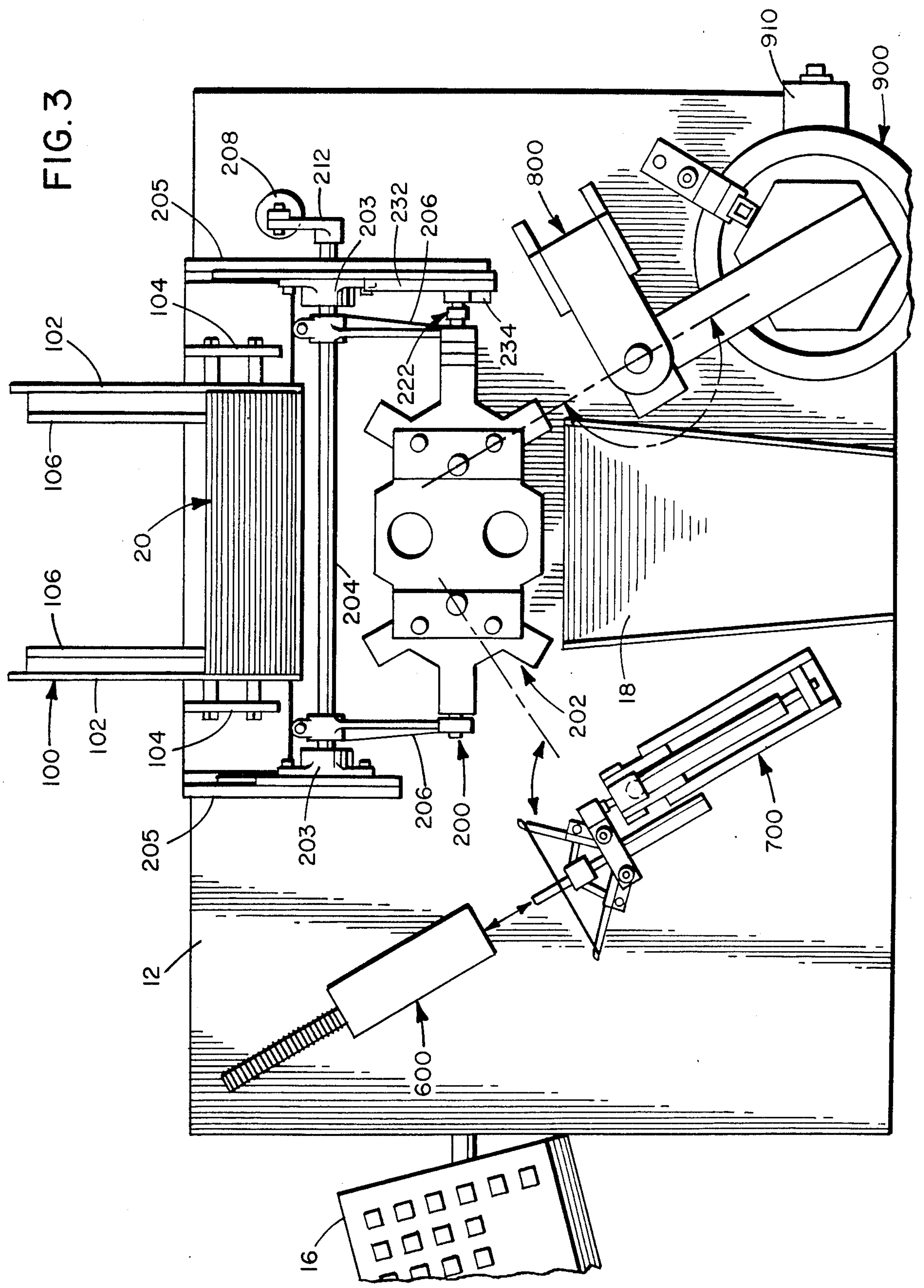
FIG. 3 is a top plan view with the housing removed.

In FIG. 2 the electrical control panel for the machine is shown generally at 16. A general orientation of the polyhedron assembly machine according to the present invention is shown in the top plan view illustrated in FIG. 3 and the side elevation of FIG. 4. As shown in FIG. 3 the polyhedron assembling machine includes a polyhedron blank magazine 100; polyhedron blank transfer assembly or placement head, shown generally at 200; a forming assembly, shown generally at 300; a rubber band conveying mechanism, shown generally at 600; a rubber band inserting mechanism, shown generally at 700; an adhesive applying pivot assembly, shown generally at 800; and a glue pot assembly, shown generally at 900. The completed polyhedron is discharged from the machine by an air nozzle which blows the polyhedron falling down an inclined chute 18 to a packaging station (not shown).

As used herein, the term "blank" or "polyhedron blank" refers to a flat, unformed, carboard or paper which is shaped so that the machine of the present invention can fold it into a three dimensional polyhedron.

POLYHEDRON BLANK

Figure 43:
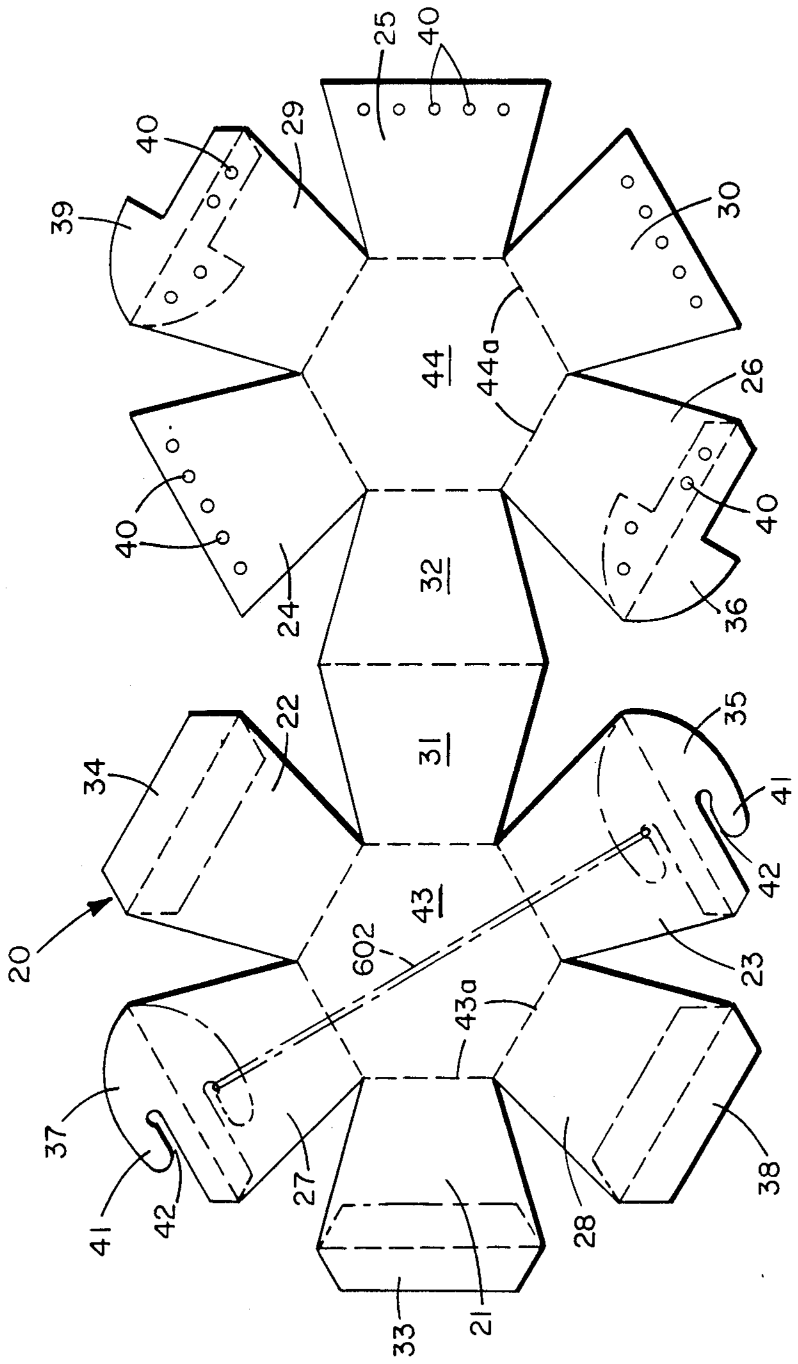
FIG. 43 is a top plan view of a polyhedron blank with the folded tabs shown in phantom line and with glue dots shown in place and a rubber band shown inserted in phantom line.
Figure 48:
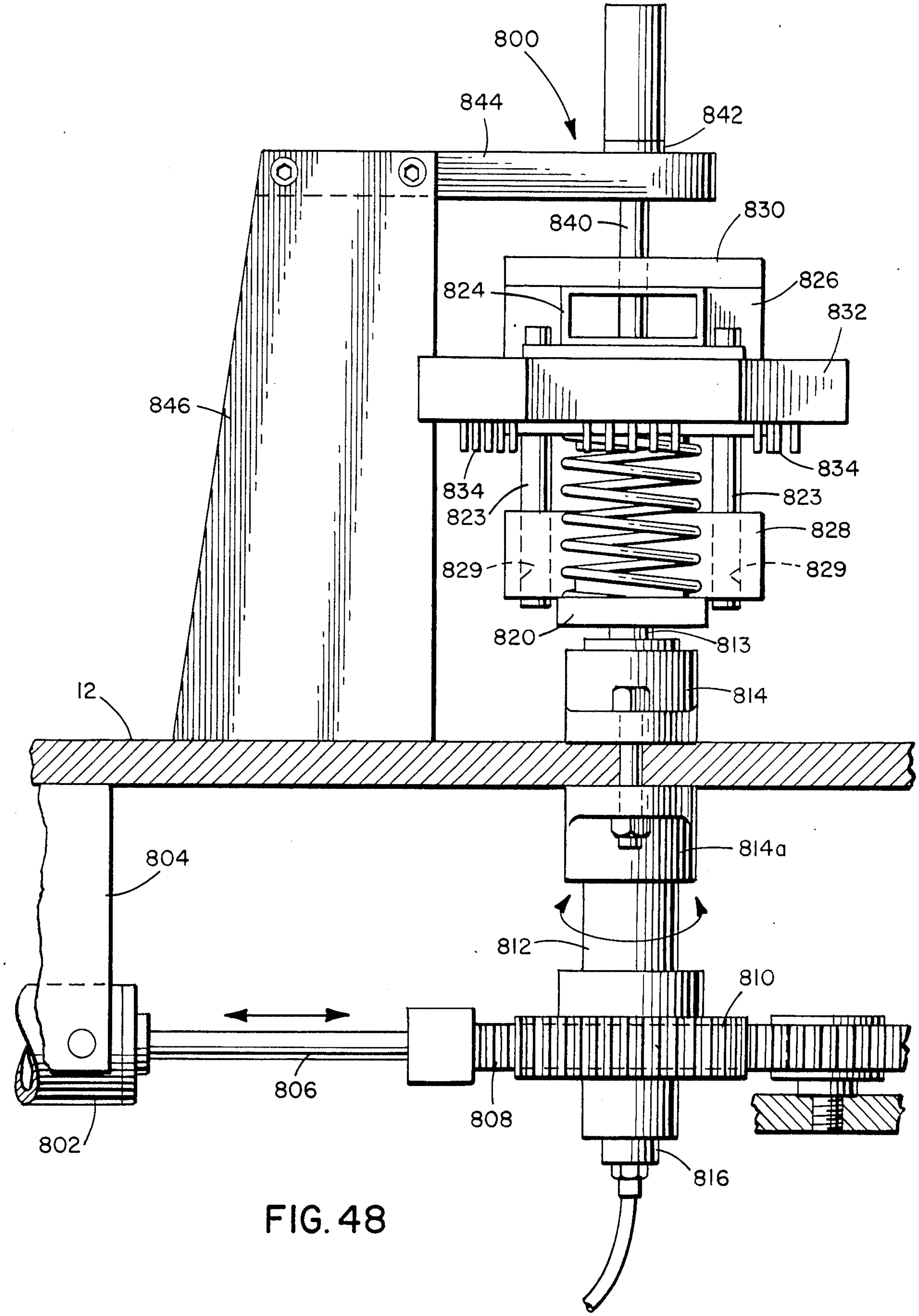
FIG. 48 is a side elevation of the glue head of the present invention.
Figure 49:
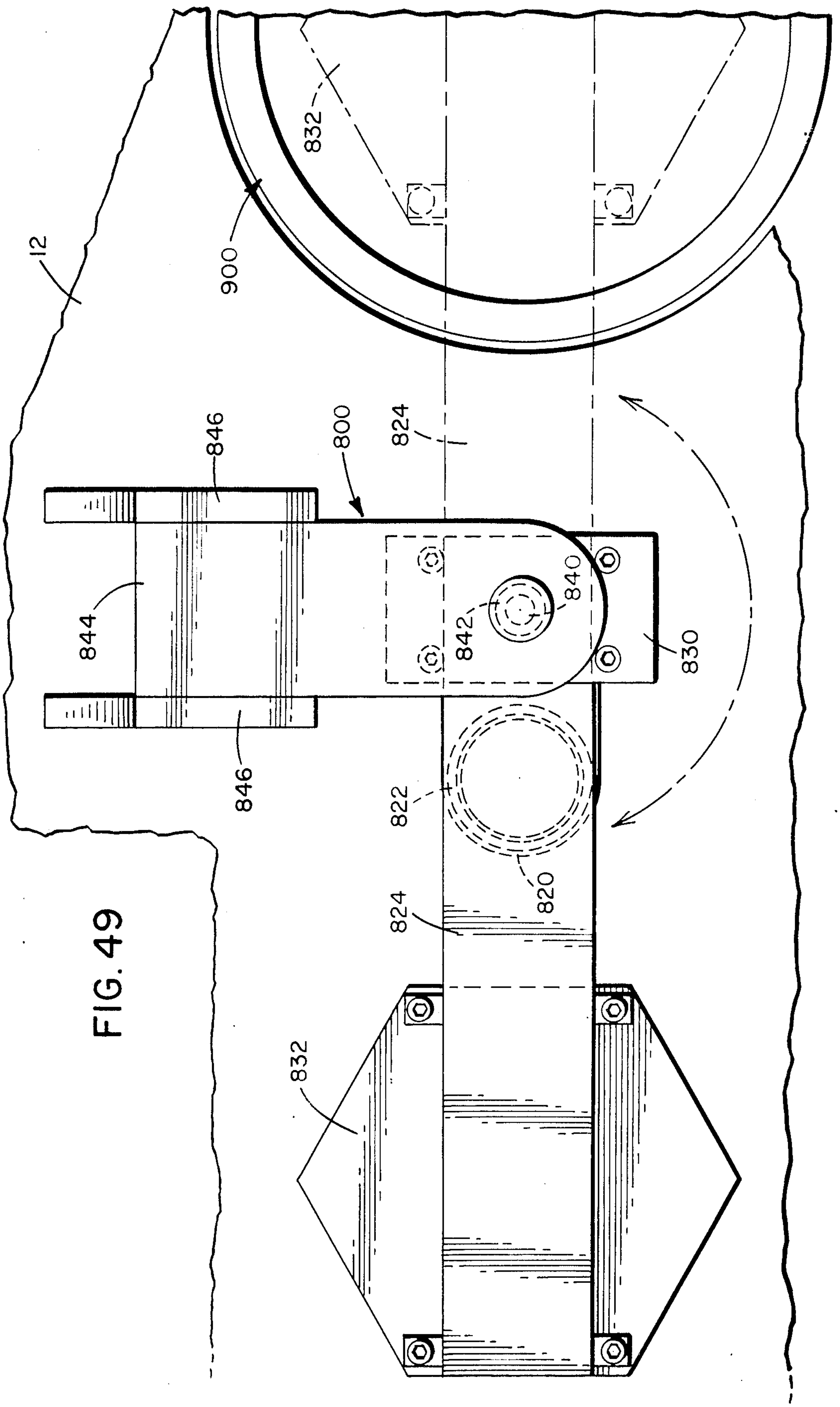
FIG. 49 is a top plan view of the glue head.
Figure 50:
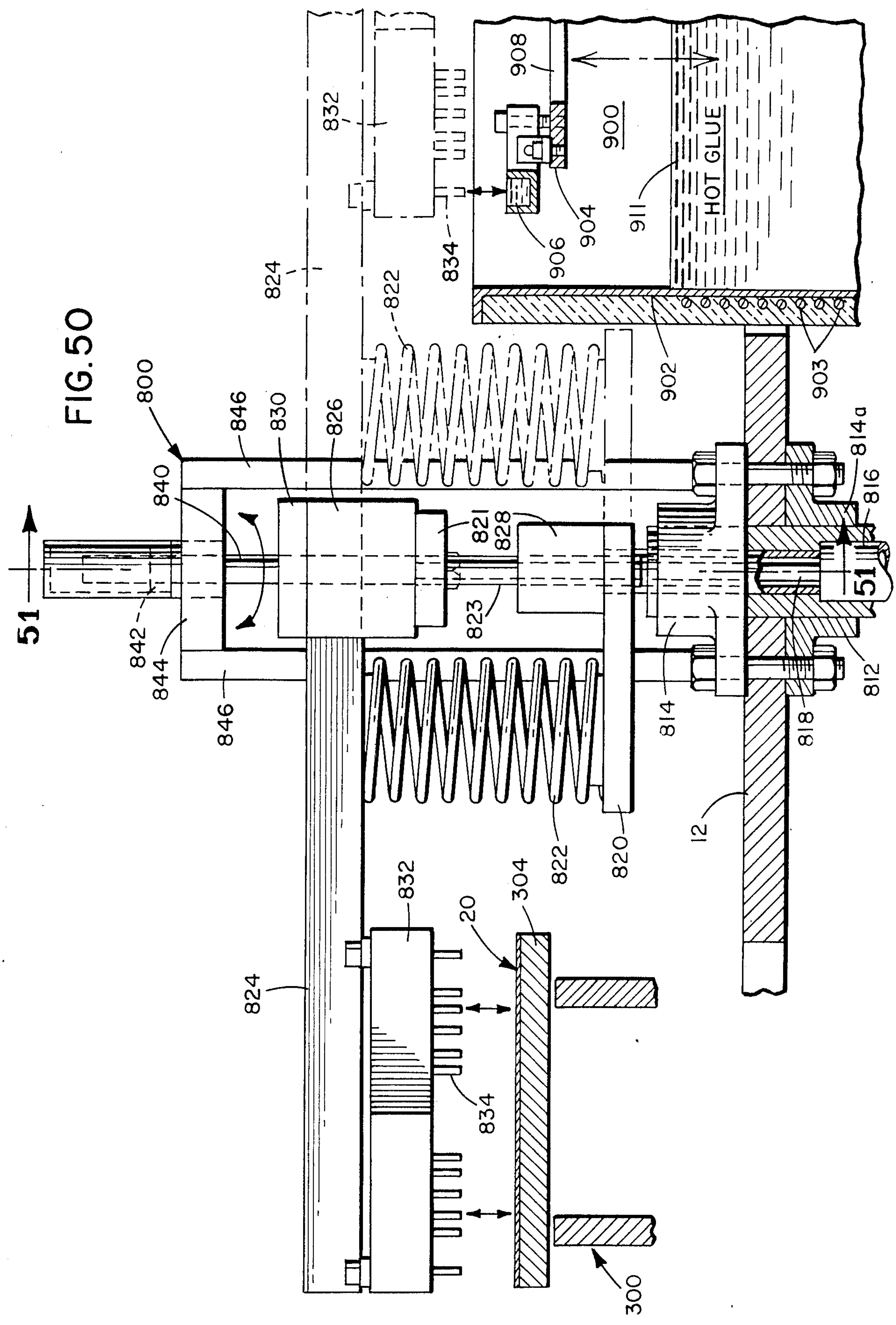
FIG. 50 is a front elevational view of the glue head.

Referring first to FIG. 43, a blank which will be formed into a polyhedron assembly using the machine of the present invention is shown in its unfolded configuration. The blank is referred to generally by reference numeral 20. Although a particular polyhedron blank is shown including 14 faces, it will be understood that this is the preferred context in which the invention is used. The polyhedron assembly machine of the present invention may be applied to forming a polyhedron of any desired shape and number of faces.

Polyhedron blank 20 includes flap members 21 through 32 and tab member 33–39. Each of flap members 21, 22, 23, 26, 27, 28 and 29 include a foldable tab shown at 33–39, respectively. Tabs 33–39 are shown by phantom lines in their folded configuration on FIG. 43. As will be described further below, flaps 24, 25, and 30, and folded tabs 36 and 39 will receive an adhesive, applied in small round spots 40, applied to them to retain polyhedron blank 20 in its assembled shape. Preferably, polyhedron blank 20 is one-piece, with flaps 31 and 32 integrally connected. Flap members 21–32 are truncated triangles attached along their short base lines to, and radiating from, hexagonal bases 43, 44.

As shown in FIG. 43, tabs 35 and 37 are formed with a hooked portion 41 and a groove 42 for retaining a resilient member or rubber band 602. Tabs 36 and 39 are shaped to complement the hook and groove of tabs 35 and 37 to which tabs 36 and 39 will be glued.

Figure 44:
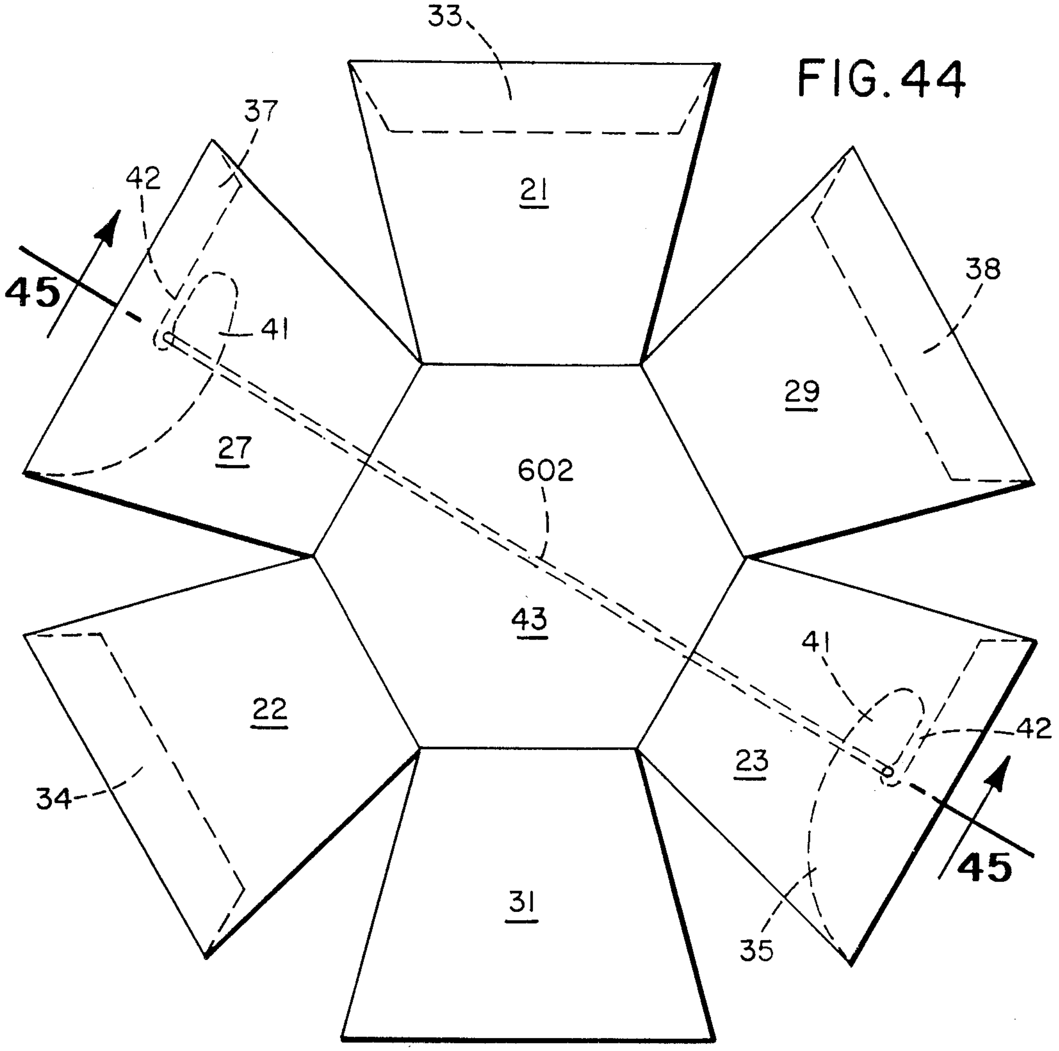
FIG. 44 is a top plan view of a polyhedron blank after it has been pressed together by the forming head.

Referring to FIG. 44, a plan view of a folded blank 20 is shown. Tabs 33, 34, 35, 37 and 38 are shown in dotted outline in their folded configuration. Resilient member 602 is shown in dotted lines inserted on hook portion 41 of tabs 35 and 37.

Figure 46:
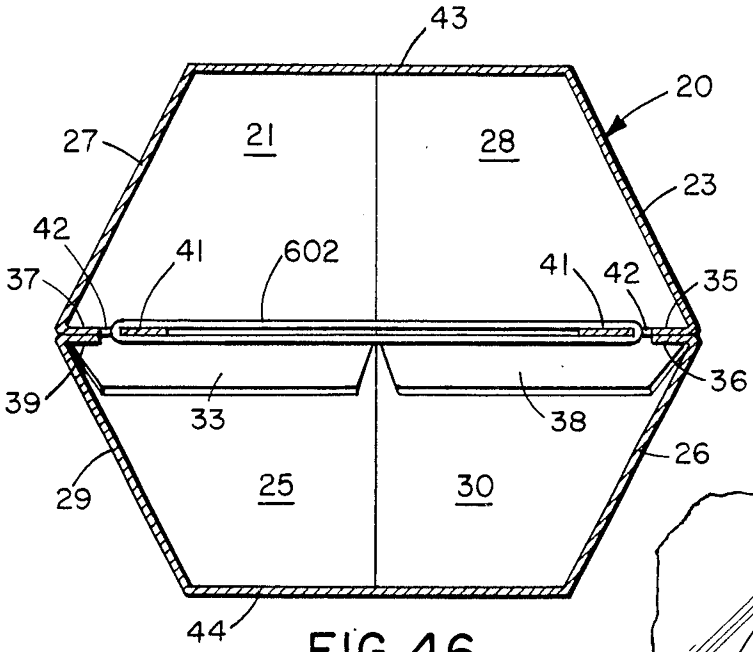
FIG. 46 is a sectional view of an expanded polyhedron.
Figure 34A:
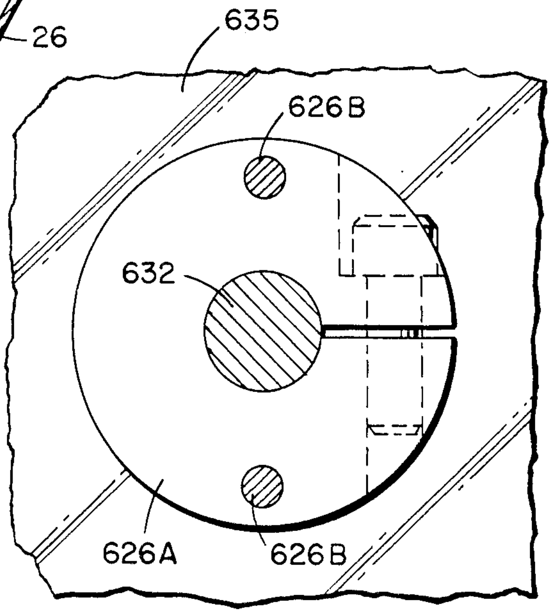
FIG. 34*a* is a sectional view taken on line 34*a*—34*a* of FIG. 34.
Figure 47:
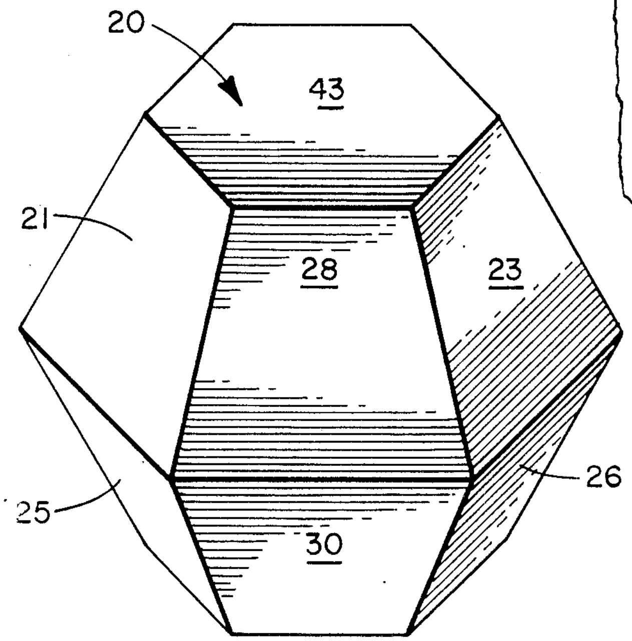
FIG. 47 is a perspective view of a completed polyhedron.
Figure 45:
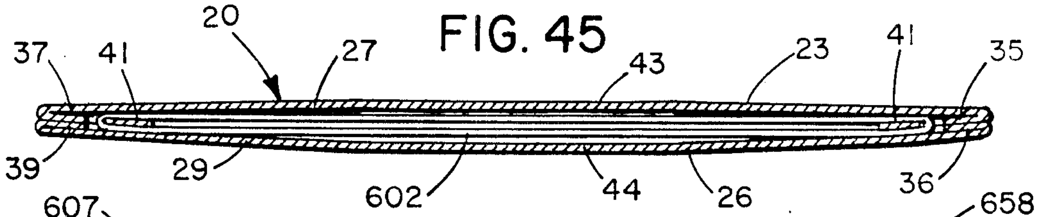
FIG. 45 is a sectional view taken along line 45—45 of FIG. 44.
Figure 36:
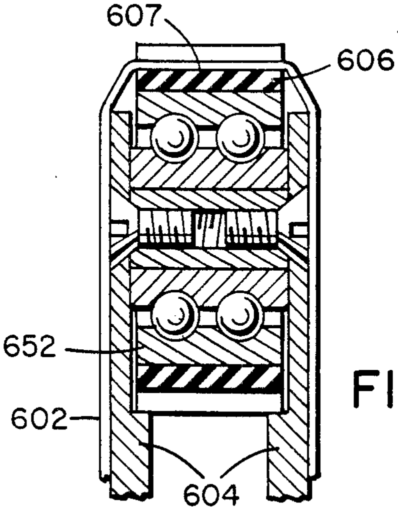

The polyhedron formed by the present invention is flexible and may be readily compressed, as shown in FIG. 45, into a flat configuration in order, for example, to be placed in an envelope or to allow glue 40 to set. When the compression force is released, the rubber band 602 biases the polyhedron into its expanded configuration, shown in FIGS. 46 and 47.

PLACEMENT HEAD AND MAGAZINE

Figure 4:
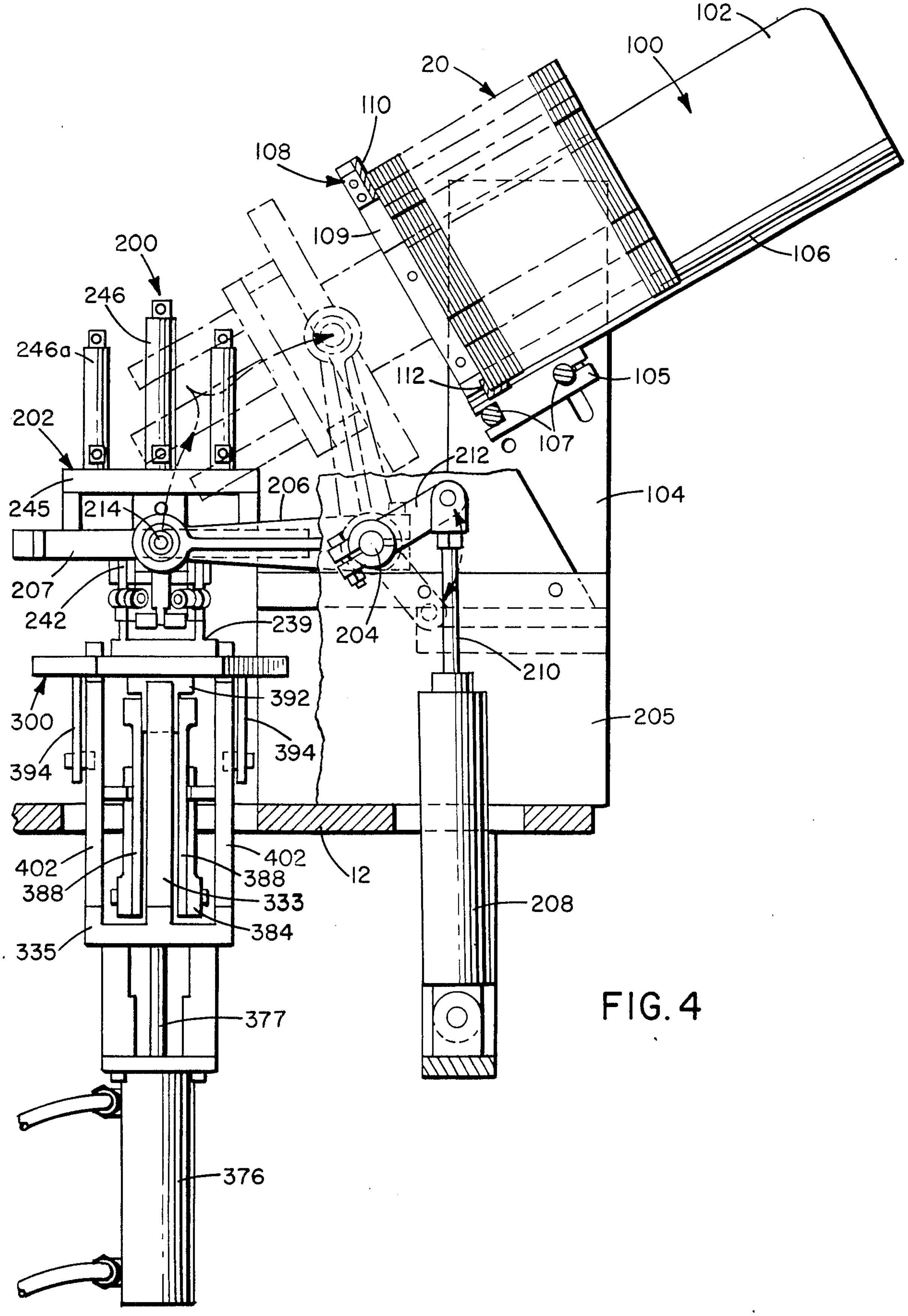
FIG. 4 is a side elevation of the magazine placement head and forming head assemblies partially in section.
Figure 5:
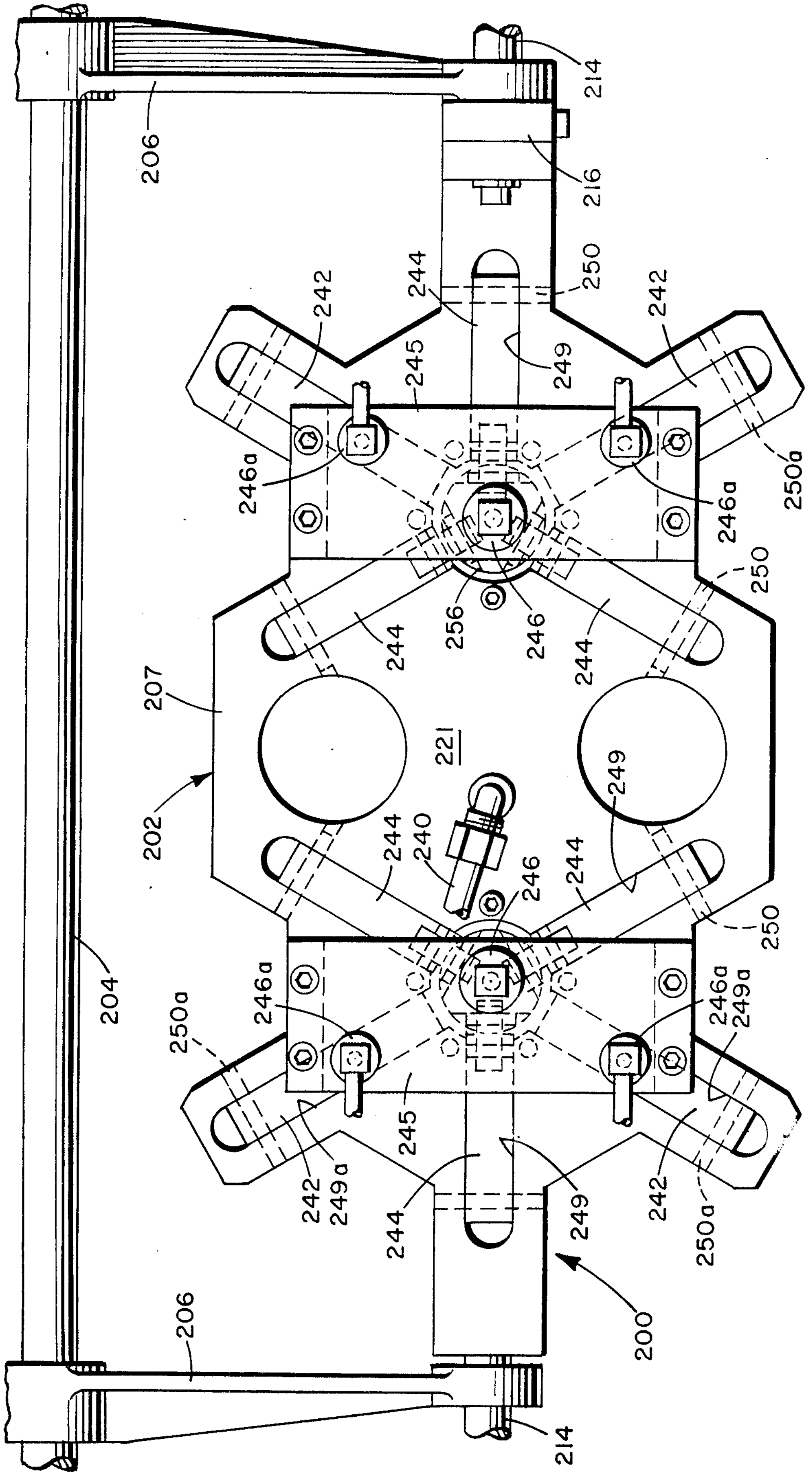
FIG. 5 is a top plan view of the placement head.

Referring now to FIG. 4, the placement head, or blank transfering assembly, and magazine will now be described.

Magazine 100 holds a supply of flat, polyhedron blanks 20. Magazine 100 comprises a pair of horizontally spaced side plates 102 fixed to frame members 104 by magazine blocks 105 (one side only being shown in FIG. 4) and support rods 107. Side plates 102 have an inwardly projecting flange 106 to support the blanks. Magazine 100 is preferably angled downwardly at about 30° to the horizontal so that gravity forces will facilitate the removal of blanks 20 from magazine 100 and will automatically advance the blanks in the magazine. An air supply nozzle (not shown) may be directed on the supply of blanks 20 in magazine 100 to facilitate the separation of an individual blank from the supply of blanks.

A generally rectangular blank support frame 108 is formed on the lower end of side plates 102. Support frame 108 comprises vertical frame members 109 which support upper and lower horizontal detents 110, 112 respectively. The center of support frame 108 is a rectangular opening through which blanks may be withdrawn, as will be described below. Support frame 108 is made slightly smaller than the blanks 20 so that the outer periphery of blanks 20 will be restrained by the support frame members. Upper and lower detents 110 and 112, respectively, facilitate the proper positioning and removal of blanks 20.

The placement head or transfer assembly 200 is shown generally in FIG. 4 and in FIGS. 5–7, 10, and 11. Placement head 200 generally serves to lift an individual blank 20 from a supply of blanks in magazine 100 and to place it on forming assembly 300 of the present invention, as will be described in detail below.

Placement head 200 comprises a head assembly 202 fixed to a pivot rod 204 by spaced pivot arms 206 at opposite sides of head assembly 202.

Pivot arms 206 are fixed to pivot rod 204 which rotates in bearings 203 fixed to side plates 205 which are fixed to table 12. Thus, head assembly 202 of placement head 200 can rotate between magazine 100 and forming assembly 300, as shown in FIGS. 4 and 6.

Placement head 202 is actuated by pneumatic cylinder 208 fixed to support table 12. Piston rod 210 of pneumatic cylinder 208 is connected by a connecting arm 212 to one end of shaft 204. As piston 210 is extended, placement head 202 is moved to its lower position adjacent forming assembly 300. As piston rod 210 is retracted, placement head 202 is pivoted to a position adjacent magazine 100.

Head assembly 202 is rotatably journaled in arms 206 by stub shafts 214 fixed to plate 207 by clamp assembly 216. Head assembly 202 is thus able to rotate within arms 206 as arms 206 are rotated on pivot rod 204.

Figure 6:
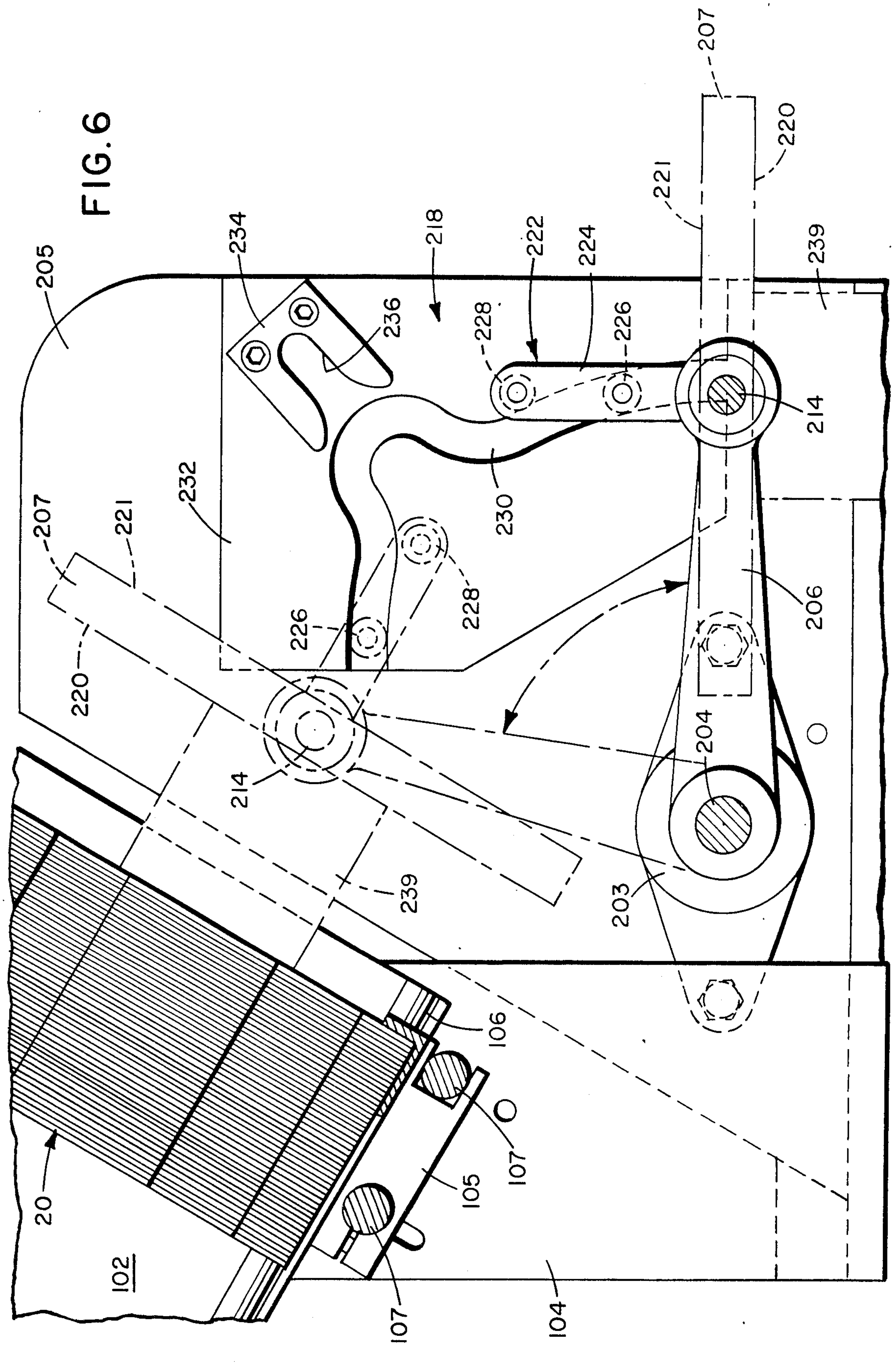
FIG. 6 is a side elevation, partially in section, of the orienting cam track for the placement head.

As arms 206 rotate on pivot rod 204, the rotational movement of head assembly 202 is defined by a cam assembly 218, shown in FIG. 6, which causes the face 220 of plate 207 to move from a position parallel to support frame 108 of magazine 100 to a position parallel to forming assembly 300. Cam assembly 218 comprises a cam follower 222 fixed to one of the journal rods 214 at one end of head assembly 202. Cam follower 222 includes a link 224 on which are fixed cam pins or rollers 226 and 228. Cam roller 226 rides within cam track 230 formed in cam plate 232 fixed to side plate 205. Cam roller 228 rides outside of cam track 230.

As arms 206 rotate to a point approximately halfway between their upper position, adjacent magazine 100, and their lower position, adjacent forming assembly 300, cam pin 228 engages a cam block 234 fixed to cam plate 232. Cam block 234 has a groove 236 into which cam roller 228 extends as cam roller 226 moves along cam track 230. The cooperation of cam block 234, link 224 and cam rollers 226, 228 serve to rotate head assembly 202 through an angle of about 120° as arms 206 rotate from their upper to their lower position.

As shown particularly in FIGS. 5–10, head assembly 202 is shaped to generally conform to and support blank 20. Head assembly includes two generally symmetically constructed halves which correspond to the "wings" of blank 20. Head assembly 202 includes vacuum ports 238 which are connected to a vacuum line 240. A vacuum force is supplied to vacuum ports 238 which serves to hold blank 20 in position on head assembly 202 as placement head 202 moves between magazine 100 and forming assembly 300. Vacuum ports 238 are formed in a hexagonal housing assembly 239 fixed to front face 220 of plate 207.

Placement head 202 includes a plurality of pneumatically actuated upper flap fold-down fingers 242 and lower flap fold-down fingers 244. One finger is provided for each of flaps 21–30. Preferably there are three lower fold down fingers and two upper fold down fingers for each "wing" of blank 20. Each set of fingers operates sequentially. Pneumatic cylinders 246 and 246*a* are supported by support plates 245 positioned above the back face 221 of plate 207. Pneumatic cylinders 246 and 246*a* actuate fingers 242 and 244. As will be explained further below, to facilitate forming blank 20 into a polyhedron, it is first bent along score lines on the blank. Flap pusher assemblies on forming assembly 300 first bend the flaps of blank 20 upward along score lines 43a and 44a. Fingers 242 and 244 then push the flaps back to their generally flat position on forming assembly 300 before blank 20 is then formed into a polyhedron.

Figures 7, 8, 9:
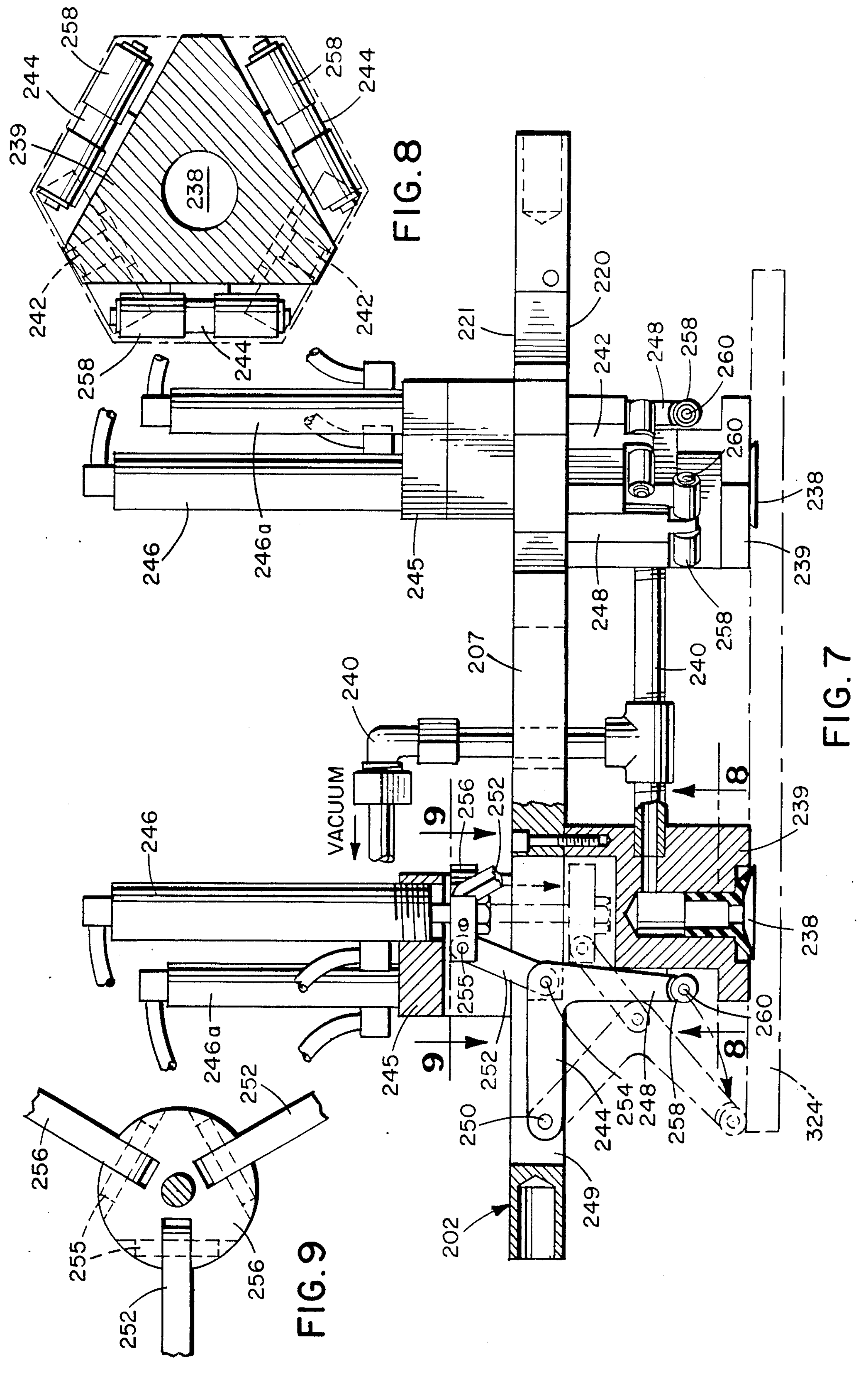
FIG. 7 is a front elevation of the placement head.
FIG. 8 is a sectional view taken on line 8—8 of FIG. 7.
FIG. 9 is a sectional view taken on line 9—9 of FIG. 7.
Figure 10:
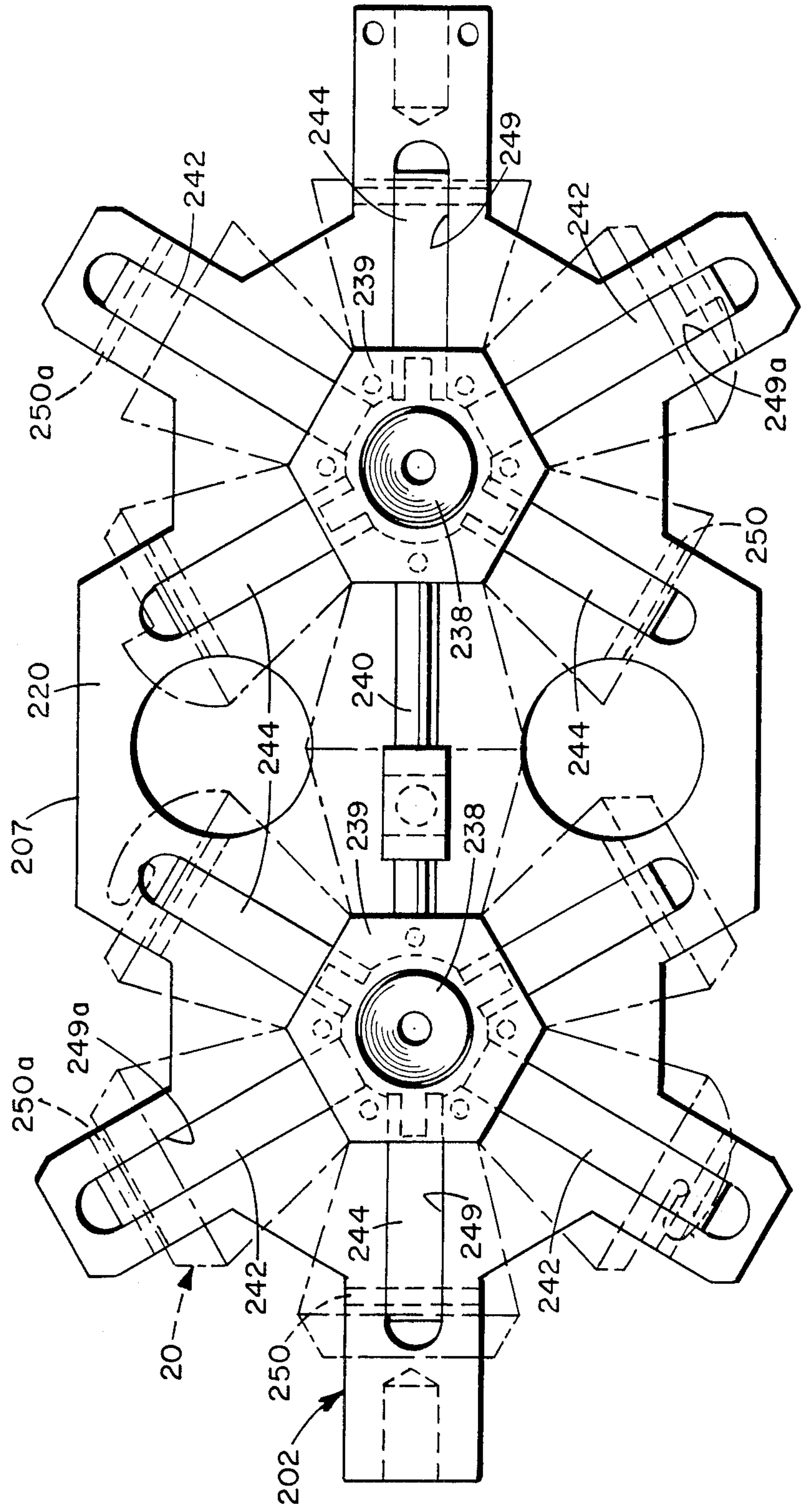
FIG. 10 is a bottom plan view of the placement head.
Figure 11:
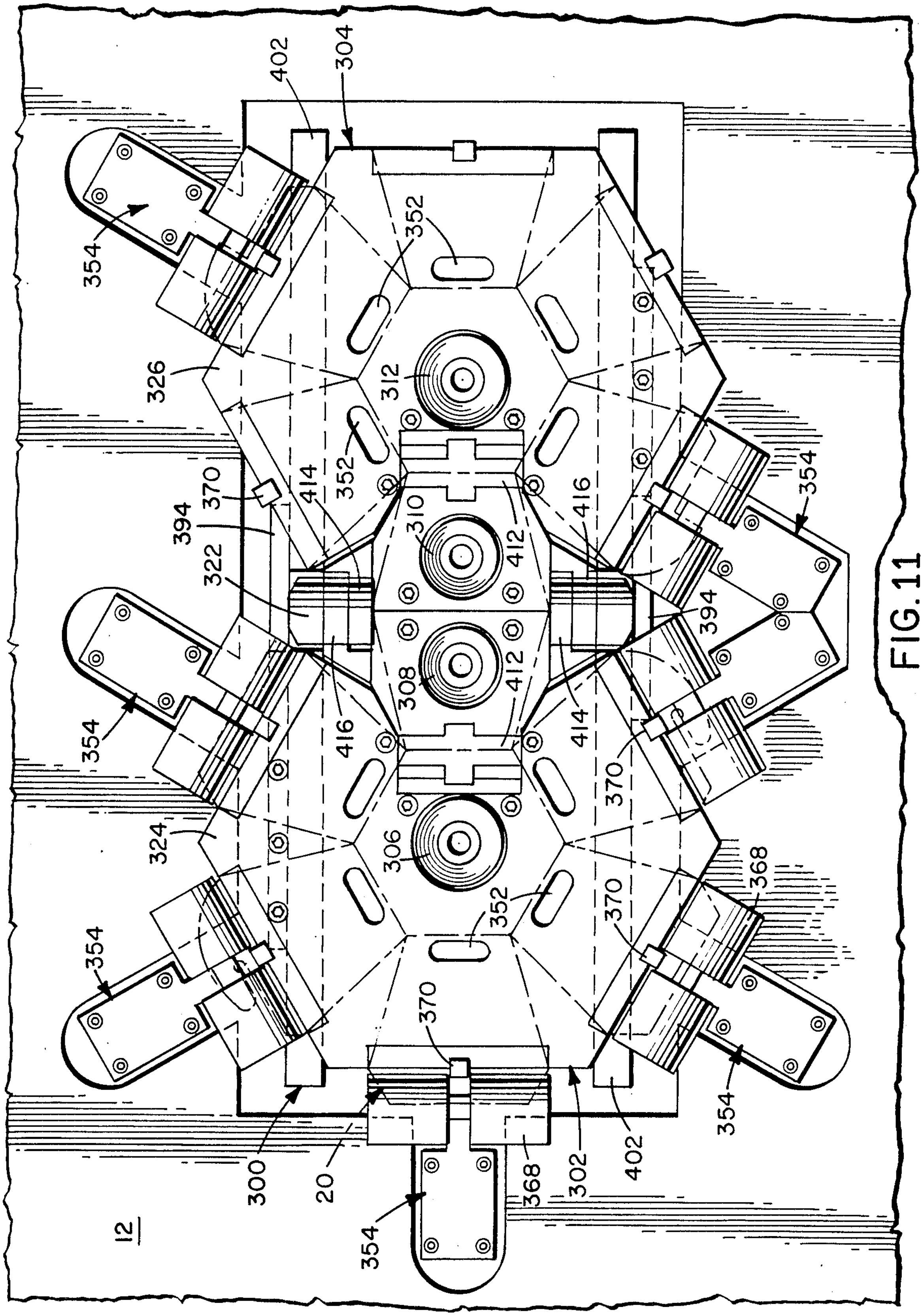
FIG. 11 is a top plan view of the forming head and the associated tab folders.

The construction of lower flap fold-down fingers 244 is shown clearly in FIG. 7. Fingers 244 comprise a generally L-shaped link 248 one end of which is pivotally connected to plate 207 by a pivot pin 250. Links 248 fit within slots 249 in plate 207 of head assembly 202. The bend or elbow section of link 248 is pivotally connected to one end of a connecting link 252 by a pivot pin 254. the other end of connecting link 252 is pivotally connected by a pivot pin 255 in a disc 256 secured to the actuating piston of pneumatic cyclinder 246. Link 248 includes a pair of rollers 258 rotatably journaled on pin 260.

Figure 26:
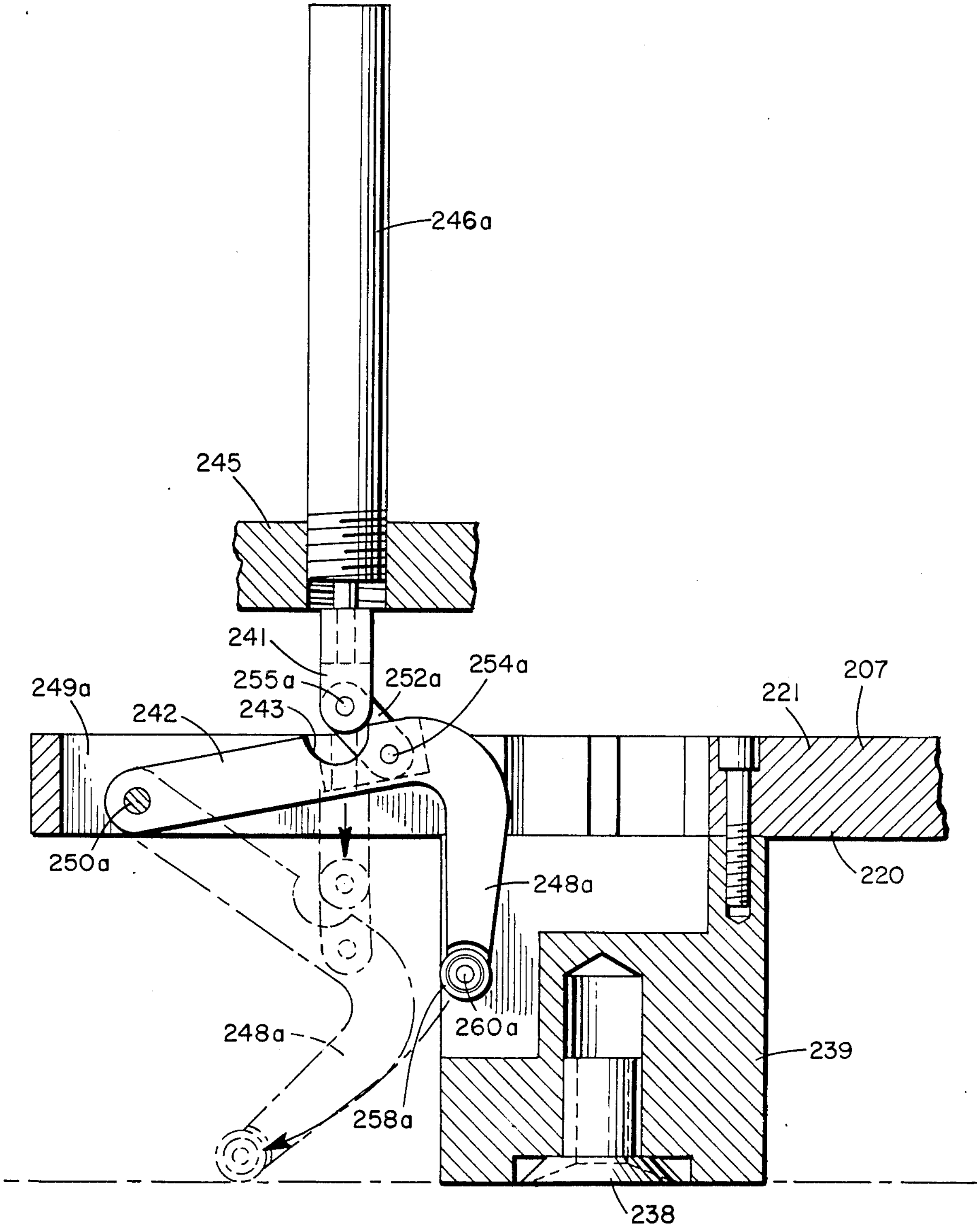
FIG. 26 is a side elevation partially in section of the short flap fold-down finger.
Figure 27:
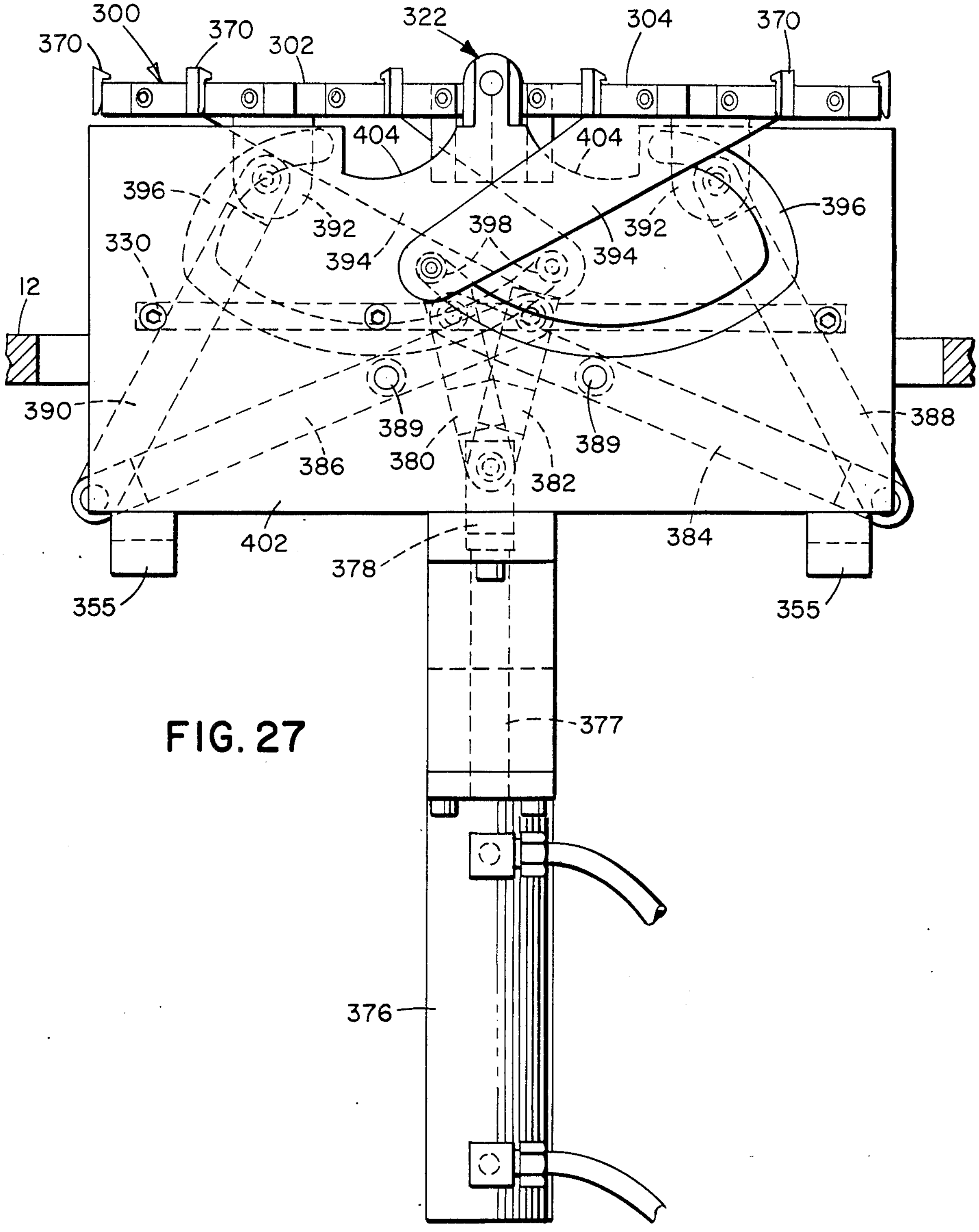
FIGS. 27 through 29 are side elevational views of the forming head in its various operating positions.

The construction of upper flap fold-down fingers 242 is shown clearly in FIG. 26. Fingers 242 are generally similar in construction to fingers 244 and like reference numerals with an "a" added will be used for similar parts. Upper fingers 242 include a notch 243 into which the round end of the clevis 241 secured to the end of the actuating piston of pneumatic cylinder 246*a* can fit when finger 242 is actuated.

FORMING FIXTURE

Referring now particularly to FIGS. 11–15, the forming assembly 300 will now be described. Forming assembly 300 is supported on table 12 and comprises a pair of planar hinged sections or wing plates 302 and 304 which are hinged together in approximately the center of forming assembly 300. Each of wing plates 302 and 304 are similarly constructed and comprise vacuum ports 306–312, connected to a vacuum source by connecting lines 314–320, respectively. Vacuum ports 306–312 serve to retain a blank 20, shown in dotted outline in FIG. 11, in position during processing.

Figure 29:
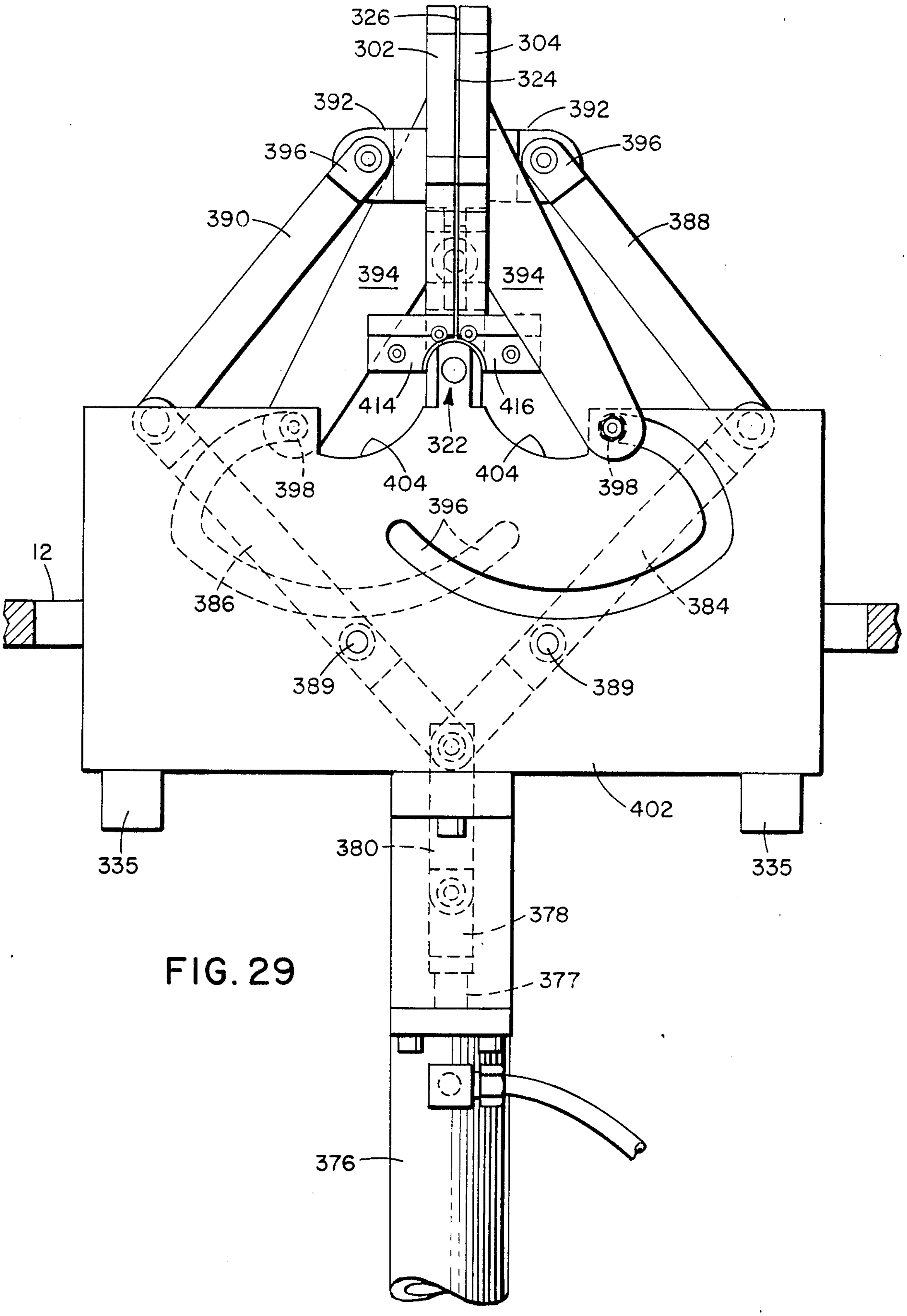

Wings 302 and 304 are hinged together, as shown generally at 322, at their interface so that wings 302 and 304 can be rotated about hinged connection 322 until their upper faces 324, 326, respectively, are adjacent, as shown in FIG. 29.

Figure 12:
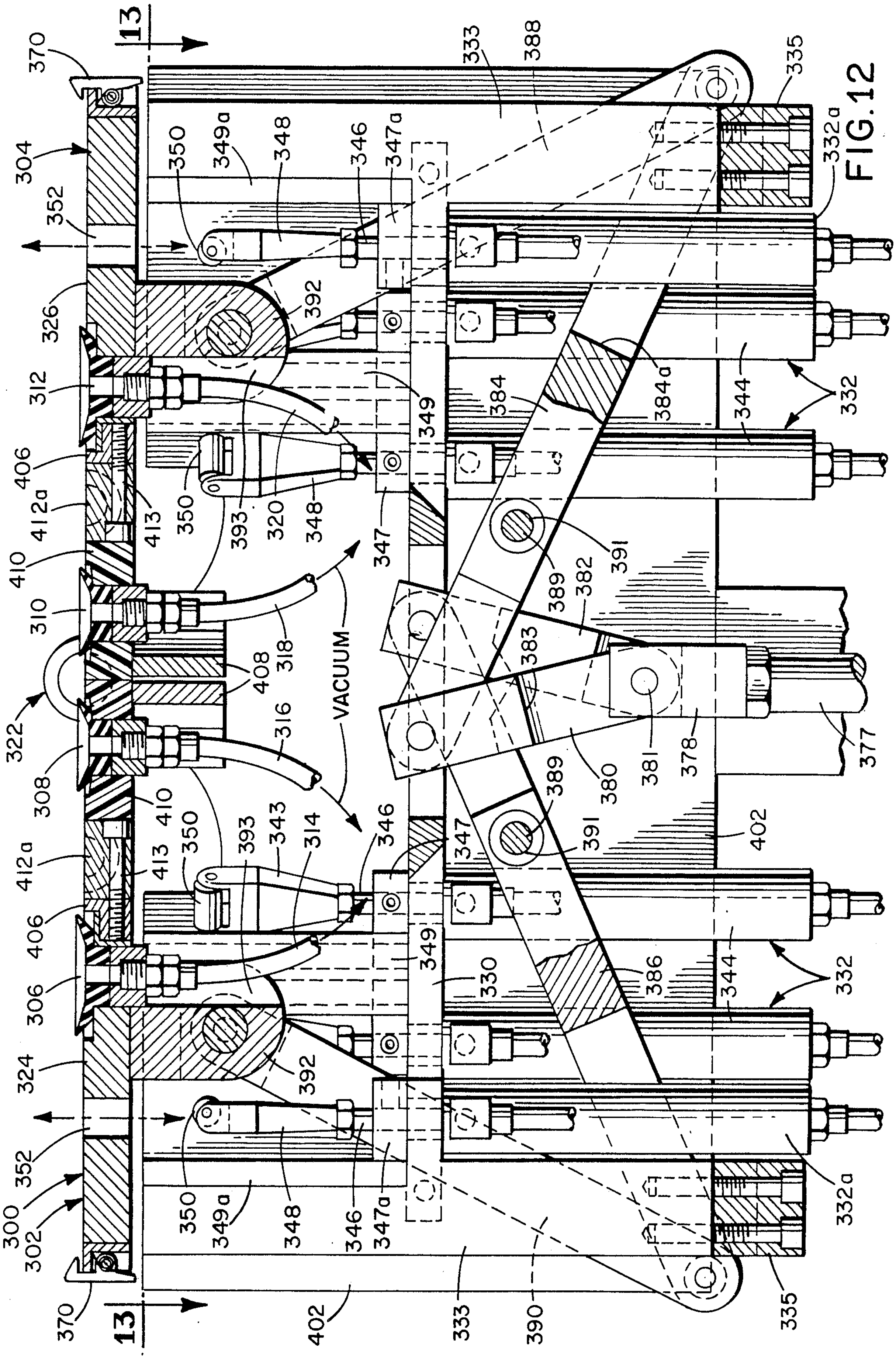
FIG. 12 is a vertical sectional view of the forming head and the associated flap pushers.
Figure 13:
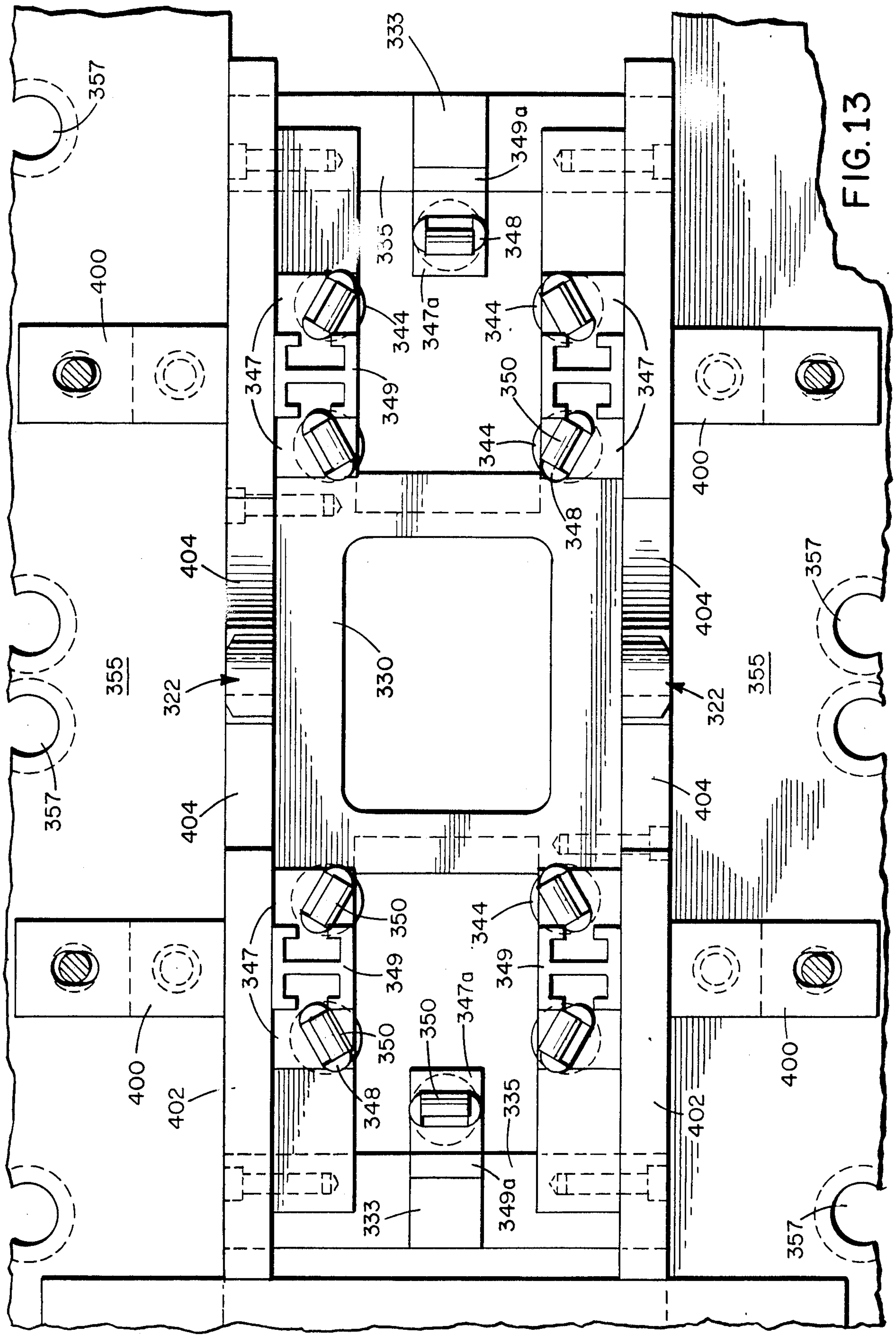
FIG. 13 is a top plan view taken along line 13—13 of FIG. 12.
Figure 14:
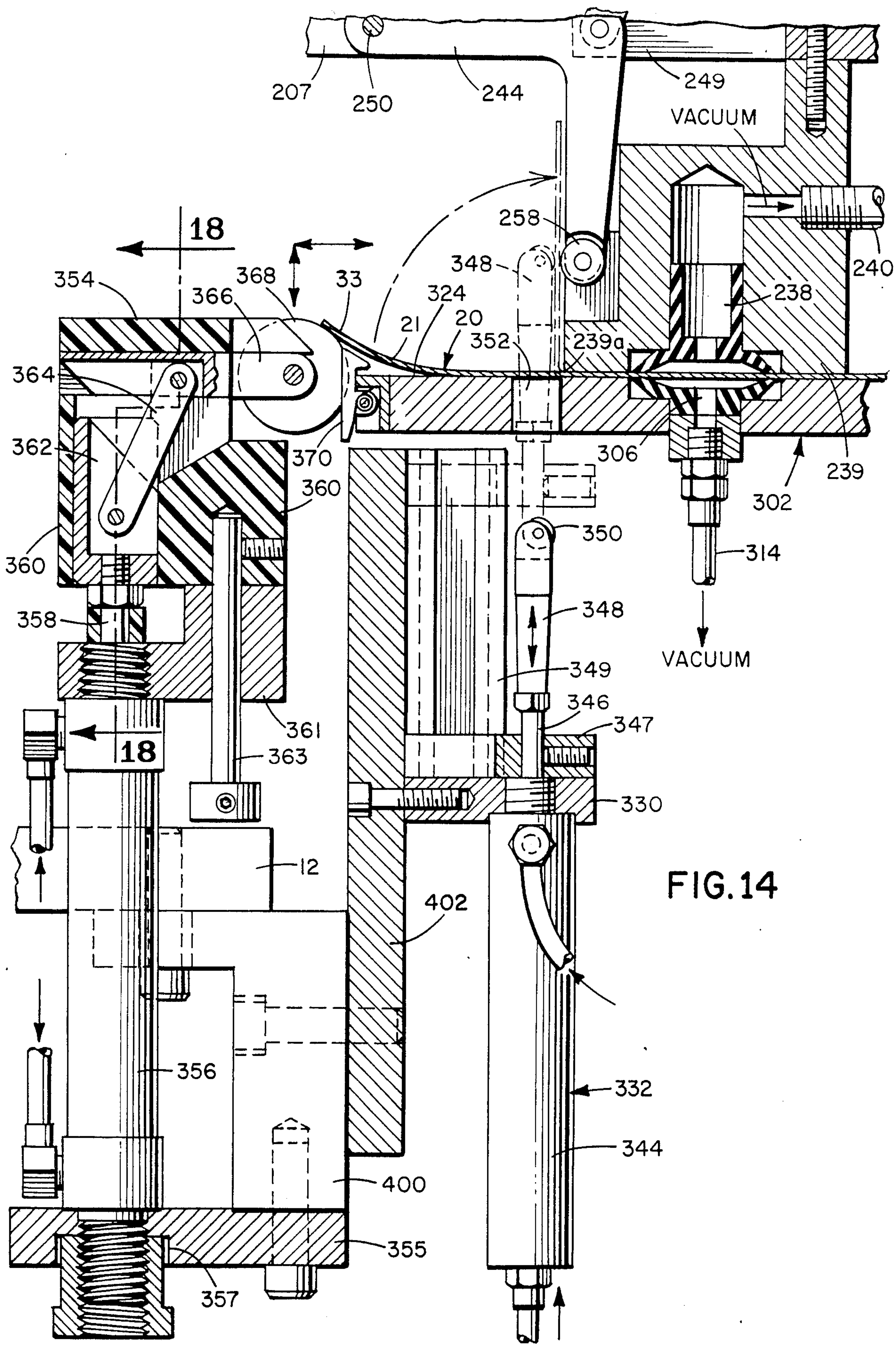
FIG. 14 is a side elevation partially in section of the tab folder mechanism and the associated flap pusher and flap fold-down finger.
Figure 16:
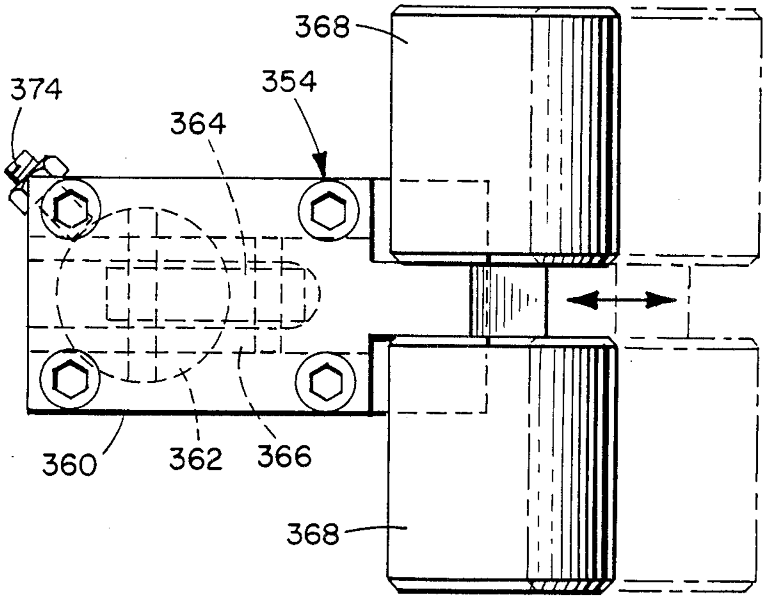
FIG. 16 is a top plan view of the tab folder.
Figure 18:
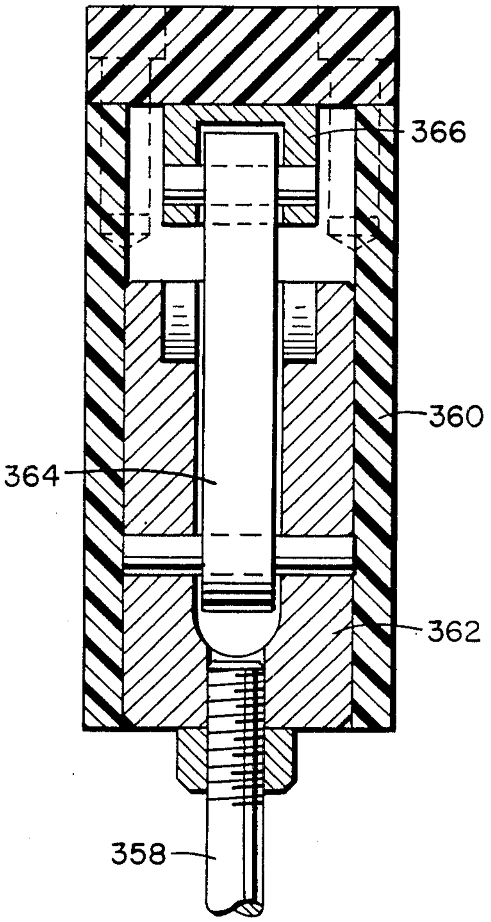
FIG. 18 is a sectional view taken along line 18—18 of FIG. 14.
Figure 25:
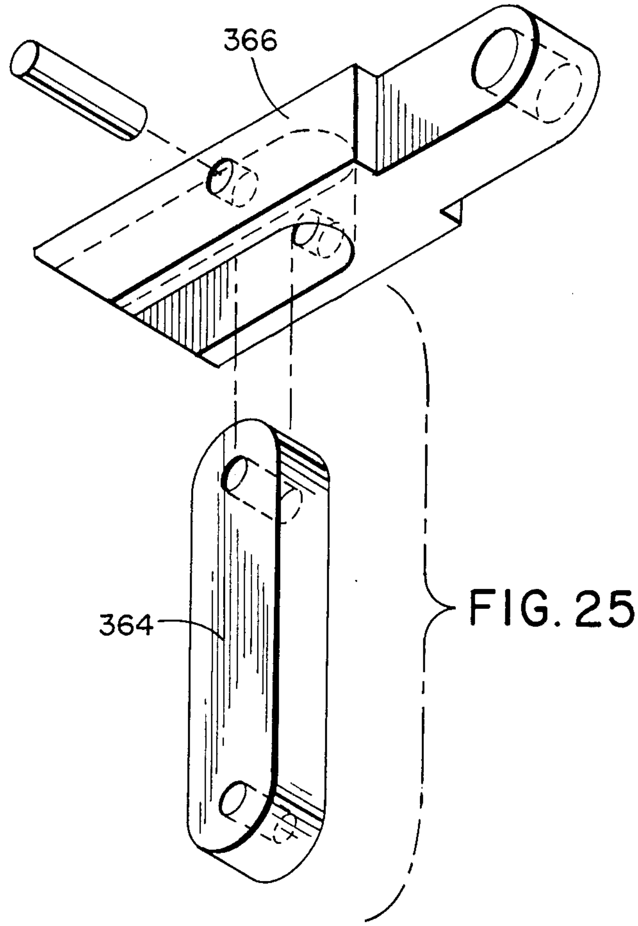
FIG. 25 is an exploided perspective view of the horizontal slide and the length between the vertical and horizontal slides.
Figure 21:
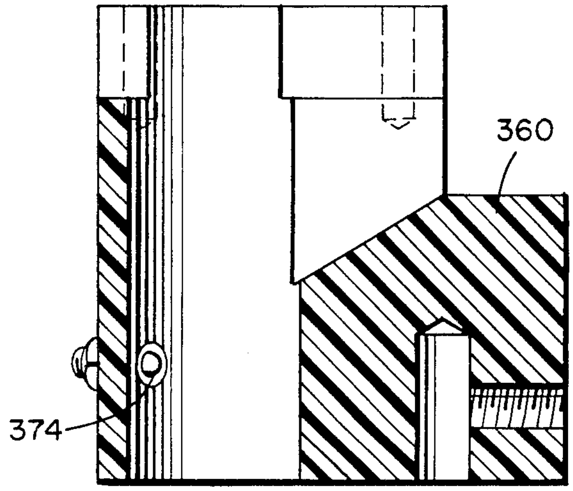
FIG. 21 is a sectional view taken along line 21—21 of FIG. 19.
Figure 20:
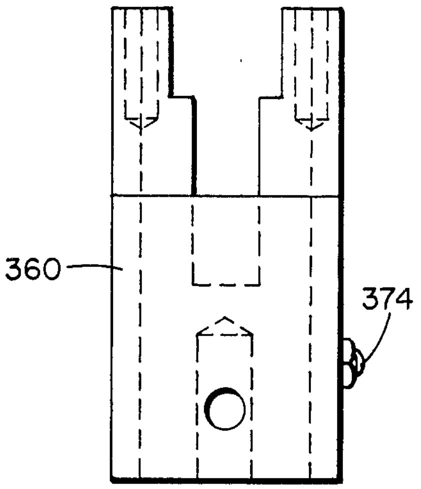
FIG. 20 is a front elevation view of the tab folder block shown in FIG. 19.
Figure 19:
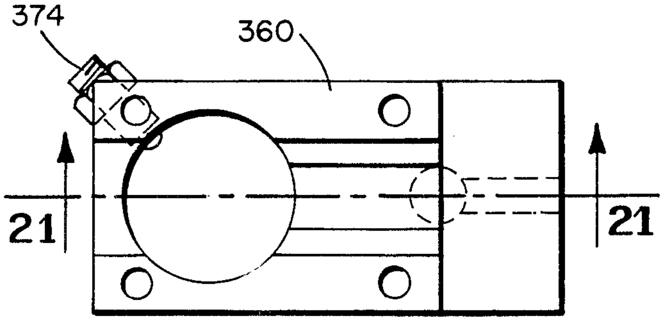
FIG. 19 is a top plan view of the tab folder block.
Figure 22:
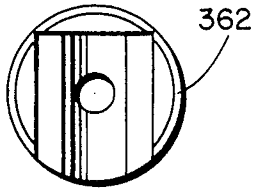
Figure 24:
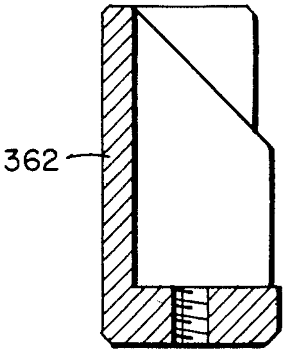
FIG. 24 is a sectional view taken along line 24—24 of FIG. 23.
Figure 23:
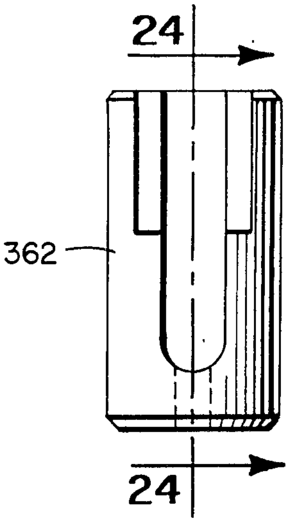
FIG. 23 is front elevation of the vertical slide.

Positioned below wings 302, 304 is a flap pusher cylinder support plate 330. Support plate 330 supports hydraulically actuated flap pusher assemblies 332. Each flap pusher assembly comprises a pneumatic cylinder 344 which drives piston rod 346 up and down as shown in FIG. 14. Fixed to piston rod 346 is a roller assembly comprising a roller bracket 348 rotatably supporting a roller 350. Rod guide 347 and rod guide block 349 guide piston rod 346 of interior flap pusher assemblies 332. The two endmost flap pusher assemblies, shown at 332a in FIGS. 12 and 13, are mounted on a cylinder mounting bracket 333 mounted on support bracket 335. A guide block 347*a* bears against wear plate 349a attached to cylinder mounting bracket 333. As shown in FIG. 12, the center of roller 350 is preferably offset from the center of bracket 348 so that roller 350 projects from bracket 348.

In a preferred form there are five flap pusher assemblies 332 for each of wings 302, 304, i.e., there are a total of ten flap pushesr assemblies as part of forming assembly 300. Each of the flap pusher assemblies is positioned to correspond to each of flaps 21–30 of blank 20 when blank 20 is positioned on forming assembly 300.

Wings 302, 304 have a plurality of flap pusher openings 352 which are sized so that rollers 350 fit through openings 352 when piston rod 346 is extended, thus allowing flap pusher assemblies 332 to push flaps 21–30 upward and bend the flaps along score lines against an edge 239*a* of housing 239, as shown in FIG. 14.

Pneumatically actuated tab folding assemblies 354 are provided on forming assembly 300 for folding tabs 33–39 of blank 20 along score lines. Tab folding assemblies 354 are shown more particularly in FIGS. 14–25. These assemblies are supported on tab folder mounting plates 355 fixed to table 12 and are actuated by pneumatic cylinders 356 fixed within mounting holes 357. Each cylinder 356 actuates a piston rod 358 which is connected to a vertical slide 362 in block 360. Guide block 361, attached to the top end of cylinder 356, guides the vertical movement of block 360. Guide rod 363 fixed to block 360 slides within opening 365 to ensure proper orientation of the tab folder assembly toward the blank tabs. Vertical slide 362 moves vertically within housing 360. A connecting link 364 connects vertical slide 362 to a horizontal slide 366. A roller assembly 368 is rotatably fixed to horizontal slide 366. Thus, as piston rod 358 is extended vertically, roller 368 is extended horizontally out and over one of tabs 33–39.

A spring loaded ball detent 374 operates on the bottom edge of vertical slide 362 to momentarily delay the downward movement of vertical slide 362 and thus cause rollers 368 to exert a downward force on tab 33 as piston 358 pulls block 360 downwardly. Tab hold down fingers 370 are pivotally fixed to wings 302, 304 and biased in an upright position by clip springs 372 and serve to retain each of tabs 33–39 in their folded position after they have been bent by tab folding assemblies 354.

The interaction of flap fold down fingers 242, 244, flap pushers 332, and tab folding assemblies 354 is shown clearly in FIGS. 14 and 15. As shown in dotted outline on FIG. 14, one of the flap pusher assemblies 332 is extended vertically through opening 352 in wing 302 to bend, e.g., flap 21 along a score line 43*a* between the flap and hexagon-shaped base 43. Score lines 43*a* coincide with edge 239 of housing 239. Flap pusher assembly 332 is then withdrawn below the plane of wing 302. Flap fold-down finger 244 is then actuated to fold flap 21 back against the top surface 324 of wing 302. Flap 21 has thus been bent up and back along the score line to pre-bend the flap, before blank 20 is formed into a polyhedron. Tab folding assembly 354 is then actuated to fold tab 33 so that it will be in proper position to be glued. The precise timing and sequence of steps will be explained in detail below.

The folding linkages of forming assembly 300 will now be described with particular reference to FIGS. 12, and 27-29.

The folding linkage of forming assembly 300 is actuated by a hydraulic cylinder 376. Connecting link 378 pivotally connects piston rod 377 of hydraulic cylinder 376 to one end of each of connecting links 380 and 382. The other end of connecting link 380 is pivotally connected to pivot link 384. The second end of connecting link 382 is pivotally connected to pivot link 386. Pivot link 384 is further pivotally connected to a pair of actuating link 388. Similarly, pivot link 386 is further pivotally connected to a pair of actuating links 390. Pivot links 384, 386 are pivoted about a pivot pin 389 extending through an opening 391 and fixed to side plates 402. Actuating links 388 and 390 are further pivotally connected to link brackets 392 which are attached to the bottom surface of wings 302, 304.

Cam guide brackets 394 (FIG. 27) are fixed at one end thereof to wings 302, 304. The other end of cam guide brackets 394 has a cam follower 398 which rides in cam track 396 as cylinder 376 and links 378-390 actuate wings 302, 304.

Figure 28:
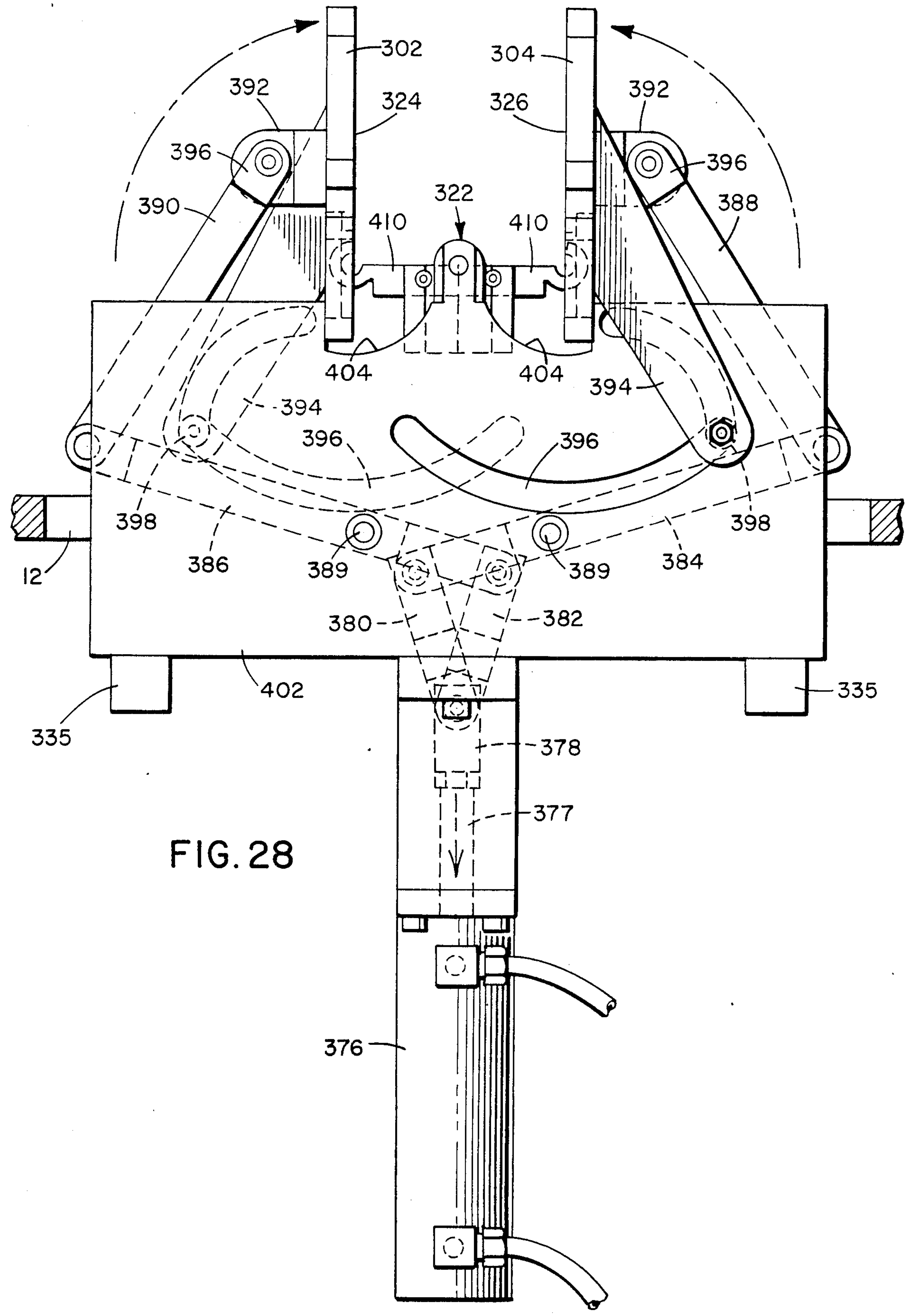

FIG. 28 shows the forming assembly in its partially folded configuration. The forming assembly is supported by support brackets 400 fixed to table 12. Side plates 402 provide the support for wings 302, 304. A cut-out portion 404 in side plates 402 is formed to allow wings 302 and 304 to pivot about pivot assembly 322. In FIG. 29, the forming assembly is shown in its fully folded position.

Figure 30:
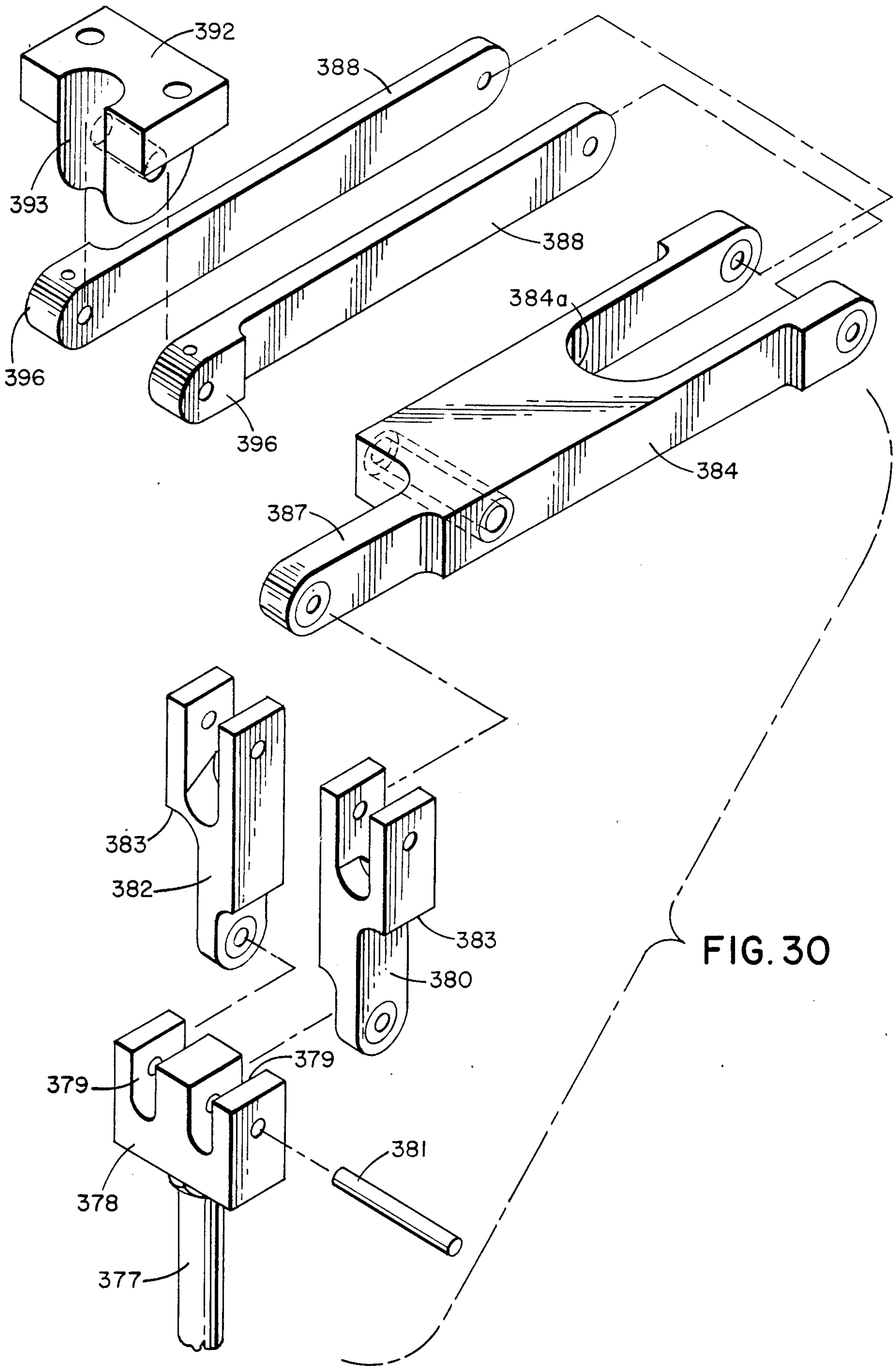
FIG. 30 is an exploded perspective view of the linkage that moves the forming head.

The linkage assembly of forming assembly 300 is shown in an exploded perspective view in FIG. 30. Piston rod 377 of hydraulic cylinder 376 is fixed to connecting link 378. Connecting links 380 and 382 are retained within grooves 379 in link 378 by connecting pin 381. Each of links 380, 382 are similarly shaped mirror images and are generally Y-shaped with offset shoulders 383. Links 380, 382 each have a groove 385 into which an offset shank portion 387 of pivot links 384, 386, respectively, is pivotally retained by a connecting pin (not shown). Only link 384 is shown in FIG. 30, link 386 being similarly constructed. Link 384 has a groove or yoke portion 394 in which actuating links 388 are pivotally pinned. The outer ends 396 of links 388 and 390 are of increased thickness and are pivotally pinned to link brackets 392. A groove 393 in brackets 392 allows for passage of vacuum lines 314 or 320.

Figure 31:
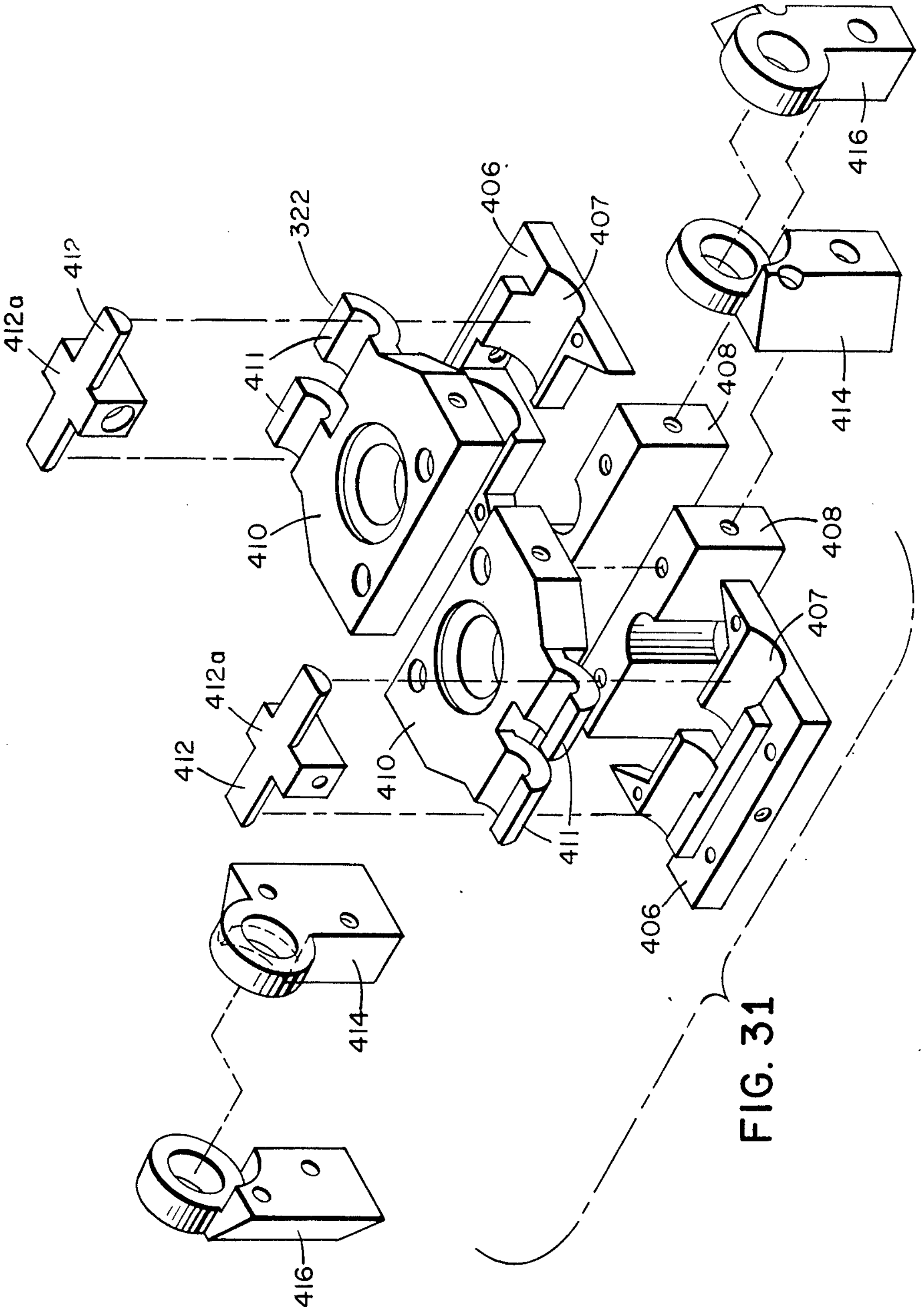
FIG. 31 is an exploded perspective view of the forming head hinge assembly.

Forming assembly hinge 322 is shown more specifically in an exploded view in FIG. 31. Hinge 322 includes lower hinge bearing elements 406 fastened to wing plates 302, 304 by screws 413. Hinge slides 410 include concave/convex arms 411 which are pivotally cradled in grooves 407 of lower hinge bearing elements 406. Hinge slides 410 are fixed to hinge spacers 408. Hinge pivot pins 412 are pivotally cradled in the concave side of spaced arms 411 of hinge slide 410. Hinge pivot pins 412 include a mounting portion **412*a* which fits between spaced arms 411 and grooves 407, and is secured to lower hinge bearing elements 406. An inner hinge 414 and an outer hinge 416 are fixed to hinge spacers 408 and to hinge slides 410. A pivot pin (not shown) is received in pivot loops 418 of assemblies 414 and 416**.

Hinge assembly 322 allows wings 302, 304 to be folded first into the position shown in FIG. 28, in which position the wing plates are pivoted about the cradle of hinge slide 410 in order to bend flaps 31 and 32 along lines **43*a* and 44*a*, respectively. Wing plates 302, 304 are then folded into the position shown in FIG. 29**.

RUBBER BAND CONVEYOR

The structure of the rubber band conveyor assembly 600 will now be described with particular reference to FIGS. 32-36. Rubber band conveyor 600 is intended to convey a supply of conventional rubber bands or other elastic elements to rubber band inserter assembly 700.

Rubber band conveyor 600 comprises side plates 604, retained within a housing 605. Plates 604 support conveyor belts 606. Conveyor belts 606 convey a supply of rubber bands 602 or other elastic elements. Preferably, conveyor belts 606 includes a plurality of grooves 607 into which rubber bands 602 may be inserted.

Figure 32:
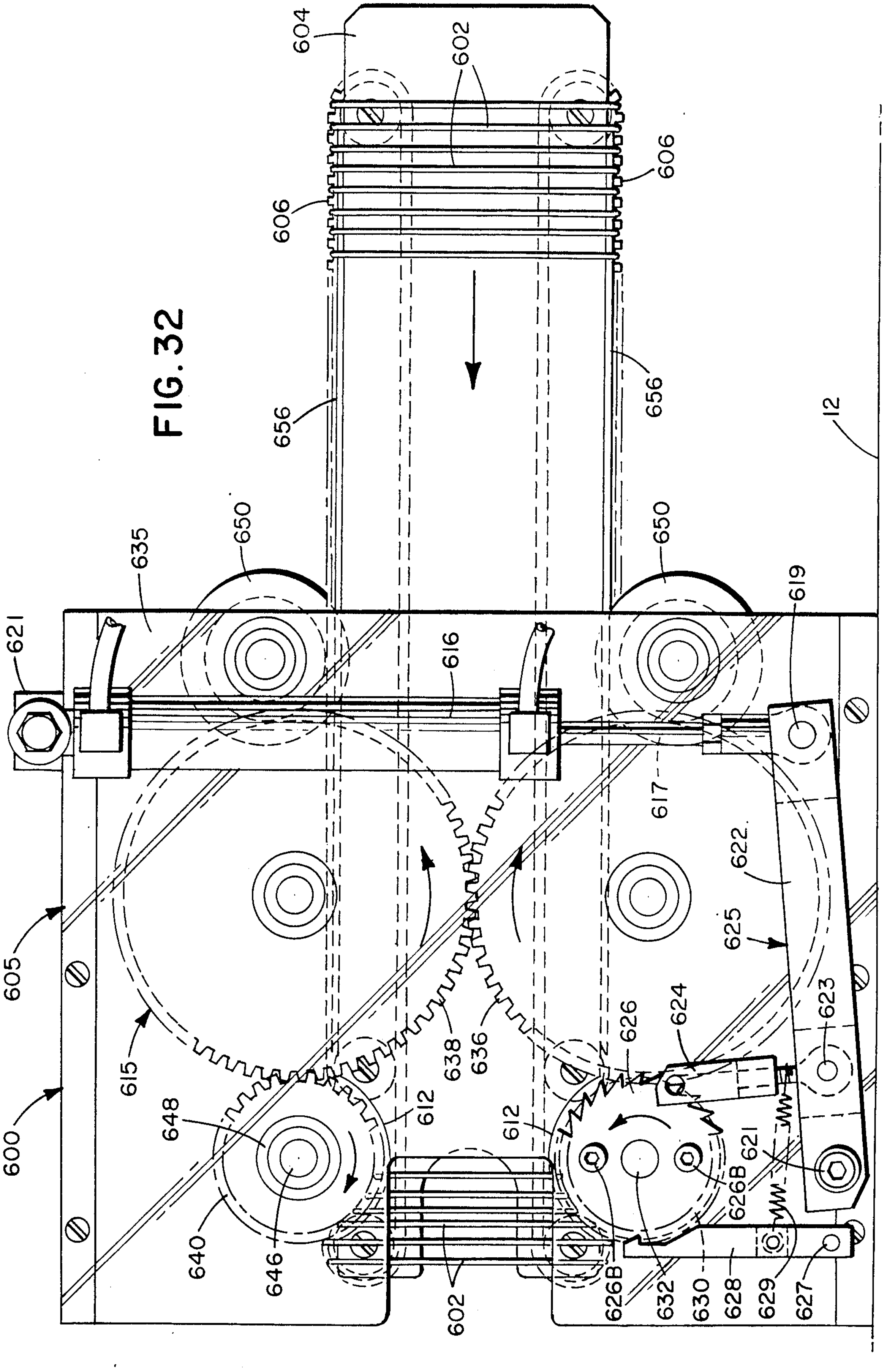
FIG. 32 is a side elevational view of the rubber band conveyor.
Figure 33:
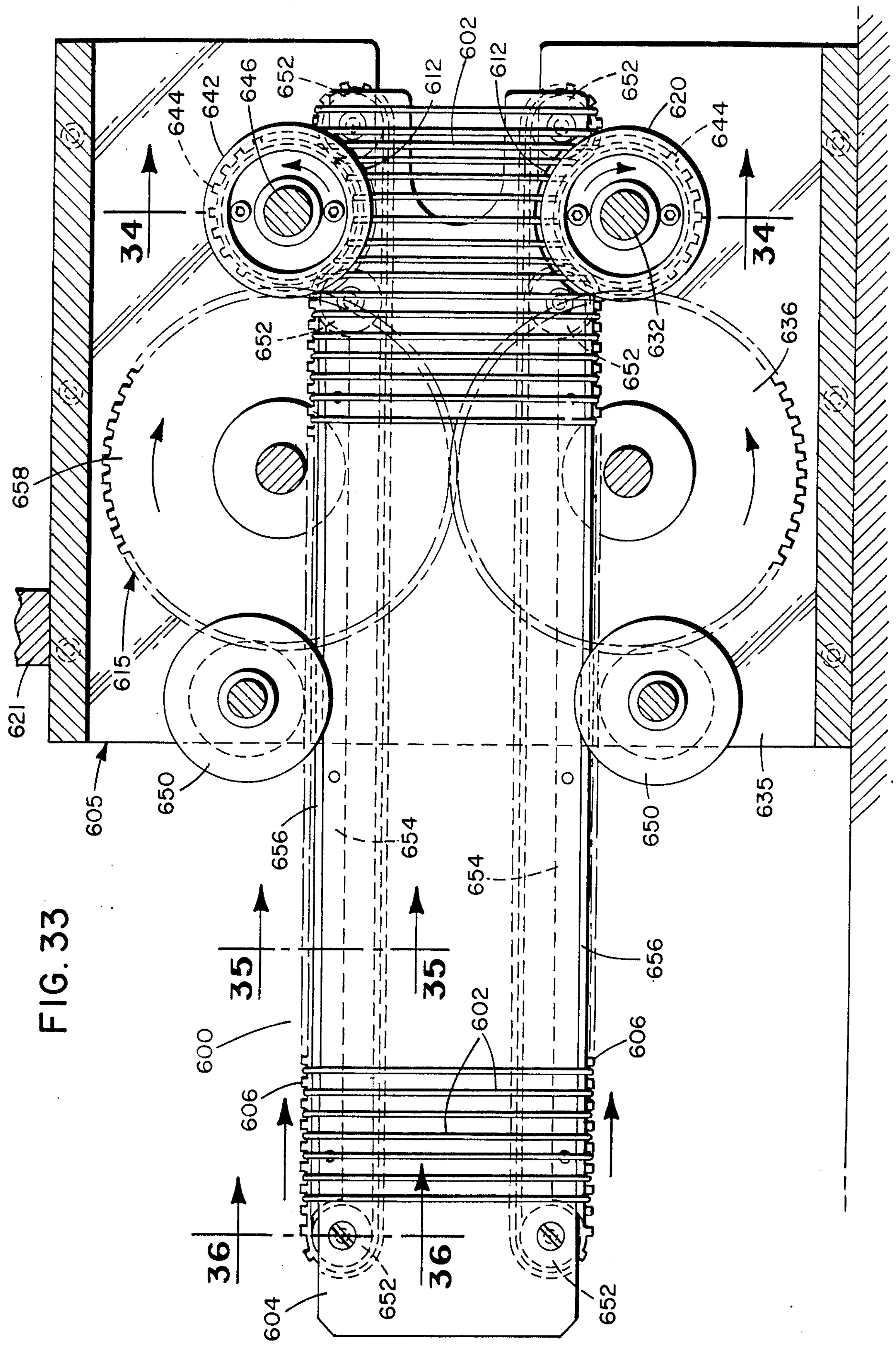
FIG. 33 is a side elevational view opposite from that shown in FIG. 31, and partially in section.

Conveyor belts 606 are spaced by side plates 604 a sufficient distance to place rubber bands 602 into a slight tension as they are conveyed in the direction of the arrow shown in FIG. 32.

Side plates 604 include a concave notch 612 at the finishing end of the rubber band conveyor which allows rubber band 602 to be relieved of their tension as they are conveyed from one end of conveyor 600 to the other. However, as rubber bands 602 exit from groove 612 onto shoulder 614 of side plate 604 they are again placed in tension. This structure facilitates the positive drive of conveyor belts 606 and properly positions and supports the conveyor.

Conveyor belts 606 are driven by gear train 615. Pawl and ratchet assembly 625 drives gear train 615.

Pneumatic cylinder 616 is pivotally fixed to a mounting block 621 on housing 605. Pneumatic cylinder 616 actuates a piston rod 617. Piston rod 617 is connected to a belt advance lever 622 by pivot joint 619. Lever 622 is connected to housing 605 by pivot joint 621. An adjustable pawl 624 is pivotally connected to lever 622 at pivot joint 623. Pawl 624 drivingly engages ratchet 626. Ratchet 626 is clamped to shaft 632 by plastic disc 626A. Screws 626B fasten ratchet 626 to disc 626A. An anti-backup pawl 628 prevents ratchet 626 from rotating in other than the counter clockwise direction as viewed in FIG. 32. Pawl 628 is pivotally connected to housing 605 at pivot joint 627. Pawls 624 and 628 are biased toward ratchet 626 by spring 629.

Figure 34:
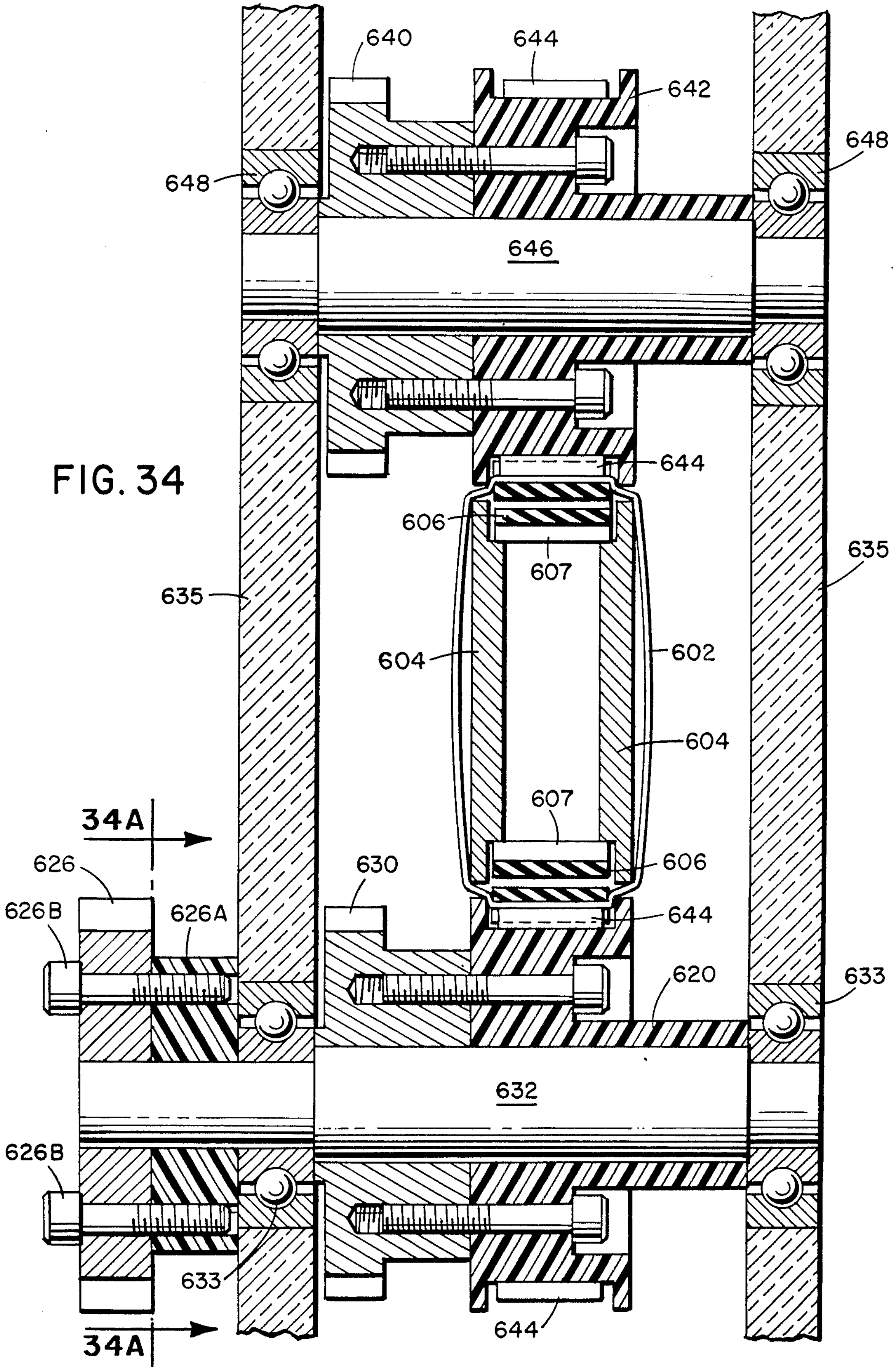
FIG. 34 through 36 are sectional views taken along their respective sectional lines on FIG. 33.

Pawl and ratchet assembly 625 drivingly engages gear 630 mounted on a common shaft 632 with ratchet 626 and fixed to lower conveyor belt drive pulley 620. Pulley 620 is journaled on shaft 632 within bearings 633 fixed within side plates 635 of housing 605, as shown in FIG. 34.

Gear 630 engages large spur gear 636, which engages a similar gear 638. Gear 638 engages small gear 640 fixed to upper conveyor belt drive pulley 642 journaled on shaft 646 within bearings 648.

Drive pulleys 620, 642 have radiating teeth 644 which engage grooves 607 of belts 606.

As piston rod 617 is actuated, pawl and ratchet assembly 625 indexes forward driving gear train 615 and thus advancing conveyor belts 606 carrying rubber bands 602.

Idler pulleys 650 guide and support conveyor belts 606.

Idler rollers 652 are positioned between side plates 604 and rotatably support and guide conveyor belts 606.

Figure 35:
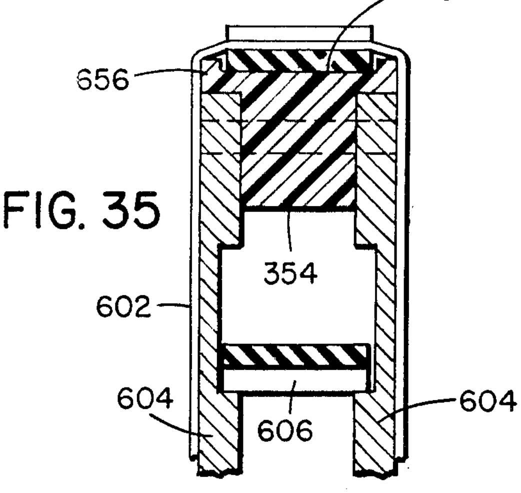
Figure 37:
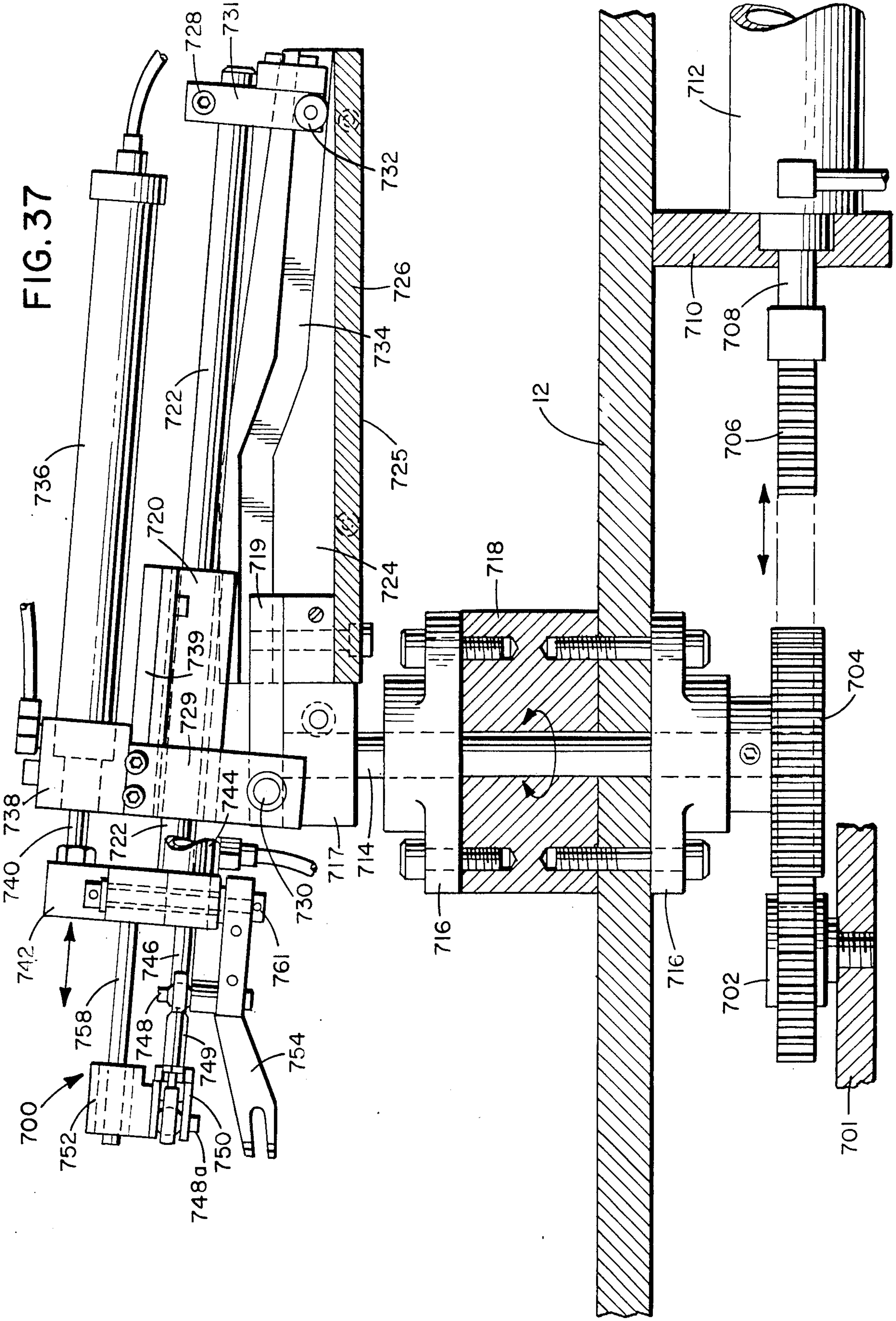
FIG. 37 is a side elevational view partially in section of the rubber band inserter.

As shown in FIG. 35, a top plate 654 having a T-shaped flange 656 and a groove 658 serves as a track for conveyor belt 606. A similar arrangement supports the bottom conveyor belt.

As rubber bands 602 are conveyed from right to left, as shown in FIG. 32, and reach the end of rubber band conveyor 600, they are received by rubber band inserter 700.

RUBBER BAND INSERTER

Rubber band inserter 700 takes an individual rubber band from rubber band conveyor 600 and inserts the rubber band in groove 42 of tabs 35 and 37 of polyhedron blank 20, which is positioned on forming assembly 300. Rubber band inserter 700 has a drive mechanism mounted under table 12. The drive mechanism includes a pneumatic cylinder 712 supported by bracket 710 mounted to the bottom side of table 12. Piston 708 of cylinder 712 is connected to a rack or flat gear 706 which drives a gear 704. Idler pulley 702 is rotatably supported by frame member 701 and abuts rack 706 to guide and support rack 706 against gear 704.

Gear 704 rotates a vertical drive shaft 714 rotationally supported by spaced bearings 716. Drive shaft 714 serves to rotate the rubber band inserter mechanism between the rubber band conveyor and the forming fixture. Spacer block 718 is is fixed to the top surface of table 12 and serves to space bearing elements 716.

Drive shaft 714 is fixed to swivel block 717 of pivot support plate 719, which in turn is fixed to cam track assembly 725, comprising side wall 724 and bottom plate 726.

In addition to pivoting from the rubber band conveyor to the forming assembly, rubber band inserter 700 is extendable longitudinally in order to retrieve a rubber band from conveyor 600 and place it in blank 20. Also, inserter 700 has fingers or jaws which actually carry the rubber band from conveyor 600 and insert it on hooks 41 of polyhedron blank 20. These fingers open to pick up an individual rubber band from conveyor 600 and close after the rubber band is inserted in blank 20. The mechanism for longitudinally extending the inserter and for opening and closing the fingers will now be described.

A slide bearing 720 is supported by slide plates 729. Side plates 729 are pivotally supported on pivot pin 730 in pivot support plate 719.

Slide rod 722 slides within slide bearing 720. A clamp screw 728 secures slide rod 722 within a cam follower block 731. Cam follower block 731 is supported by cam wheels 732 in cam tracks 734 formed in side walls 724.

A pneumatic cylinder 736 is fixed to mounting block 738 on a mounting plate 739 which is attached to slide bearing 720 and side plates 729. Pneumatic cylinder 736 actuates a linearally extensable piston rod 740 which is fixed to a cylinder mounting block 742. Cylinder mounting block 742 is fixed to the forward end of slide rod 722. Pneumatic cylinder 736 serves to linearally extend the fingers of inserter 700.

A second pneumatic cylinder 744 is provided for opening and closing fingers 754. Cylinder 744 actuates a piston rod 746. Piston rod 746 is fixed to clevis 750. A guide block 752 is fixed to clevis 750 and slides on fixed guide rod 758 which is secured in cylinder mounting block 742.

Fingers 754 are pivotally connected to cylinder mounting block 742 by pin 761. Adjustable links 749 pivotally connect clevis 750 to fingers 754 by pivot joints 748 and 748*a*. Notches 755 in the outer end of fingers 755 hold rubber band 602.

Figure 38:
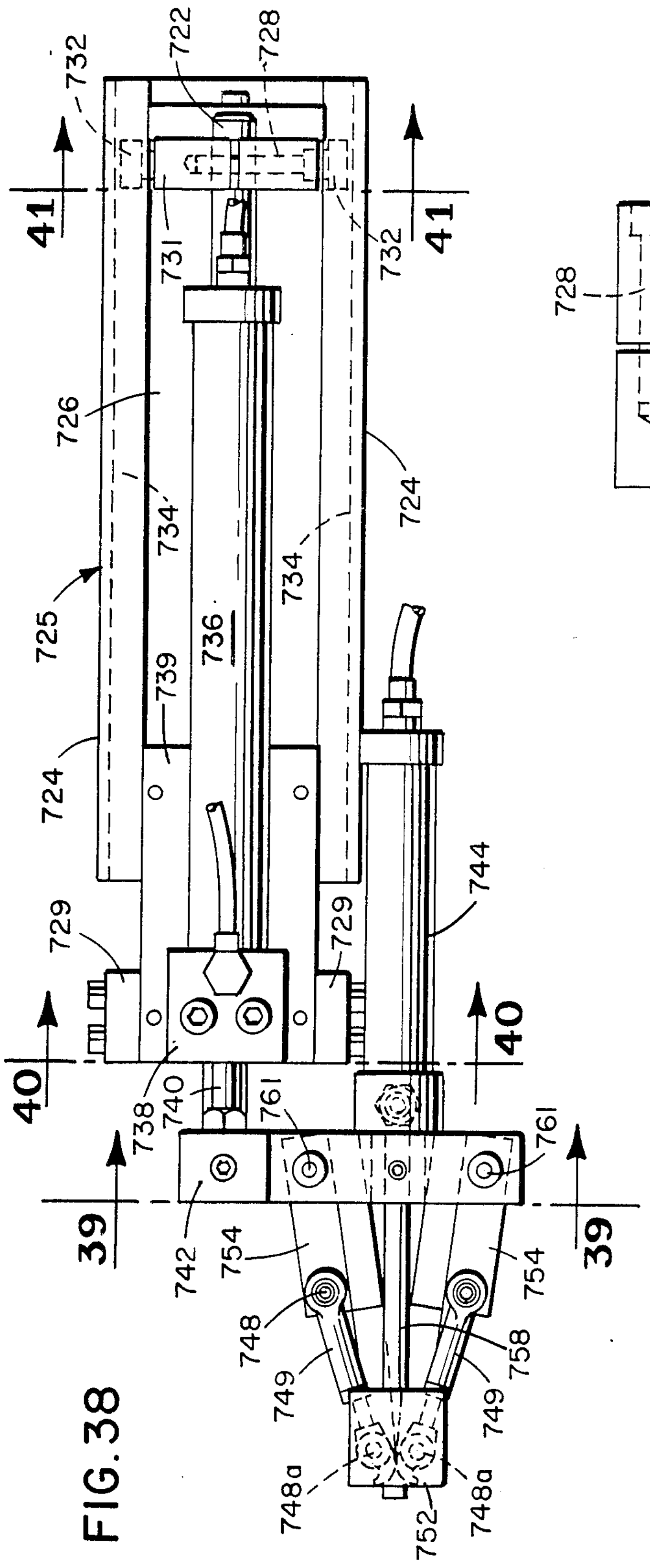
FIG. 38 is a top plan view of the rubber band inserter.
Figure 41:
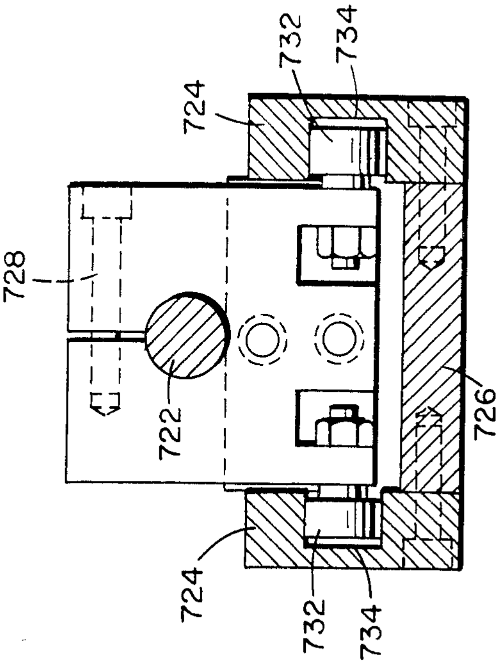
Figure 39:
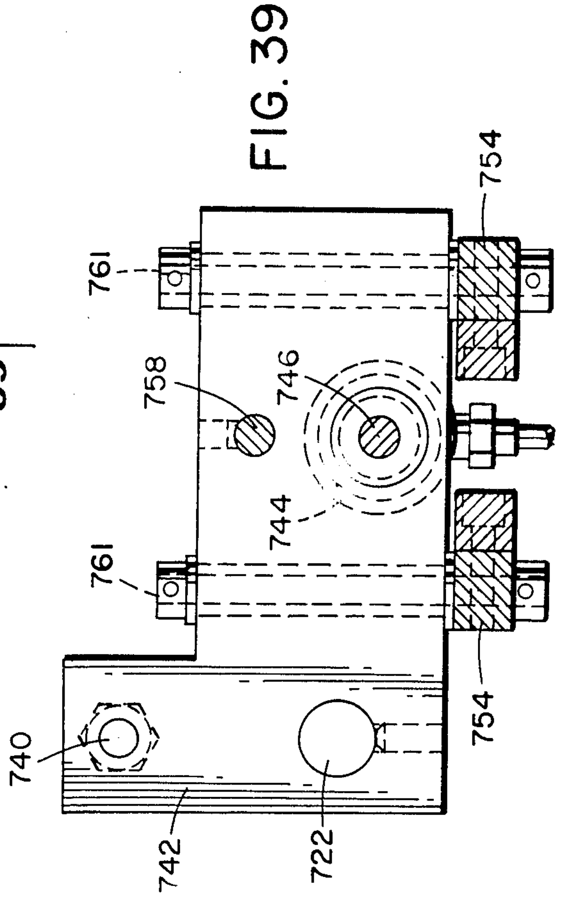

As piston rod 746 is extended, guide block 752 moves forward on guide rod 758 causing fingers 754 to pivot about pins 761 and close fingers 754, as shown in FIG. 38. As piston rod 746 is refracted, fingers 754 are caused to open, as shown in FIG. 42.

GLUE HEAD

Adhesive is applied to the polyhedron blank by an adhesive applying pivot assembly, shown generally at 800, and referred to generally as a "glue head."

Referring specifically to FIGS. 48–51, glue head 800 is driven by a rack and pinion drive assembly similar in construction and operation to the drive mechanism for rubber band insertion 700. The drive mechanism includes a pneumatic cylinder 802 supported by bracket 804 mounted to the bottom side of table 12. Piston 806 of cylinder 802 is connected to a rack or flat gear 808 which drives a gear 810.

Gear 810 rotates a vertical shaft 812 extending through table 12. Pivot shaft 812 is rotatably supported on table 12 by a bearing assembly 814, 814*a*.

Figure 51:
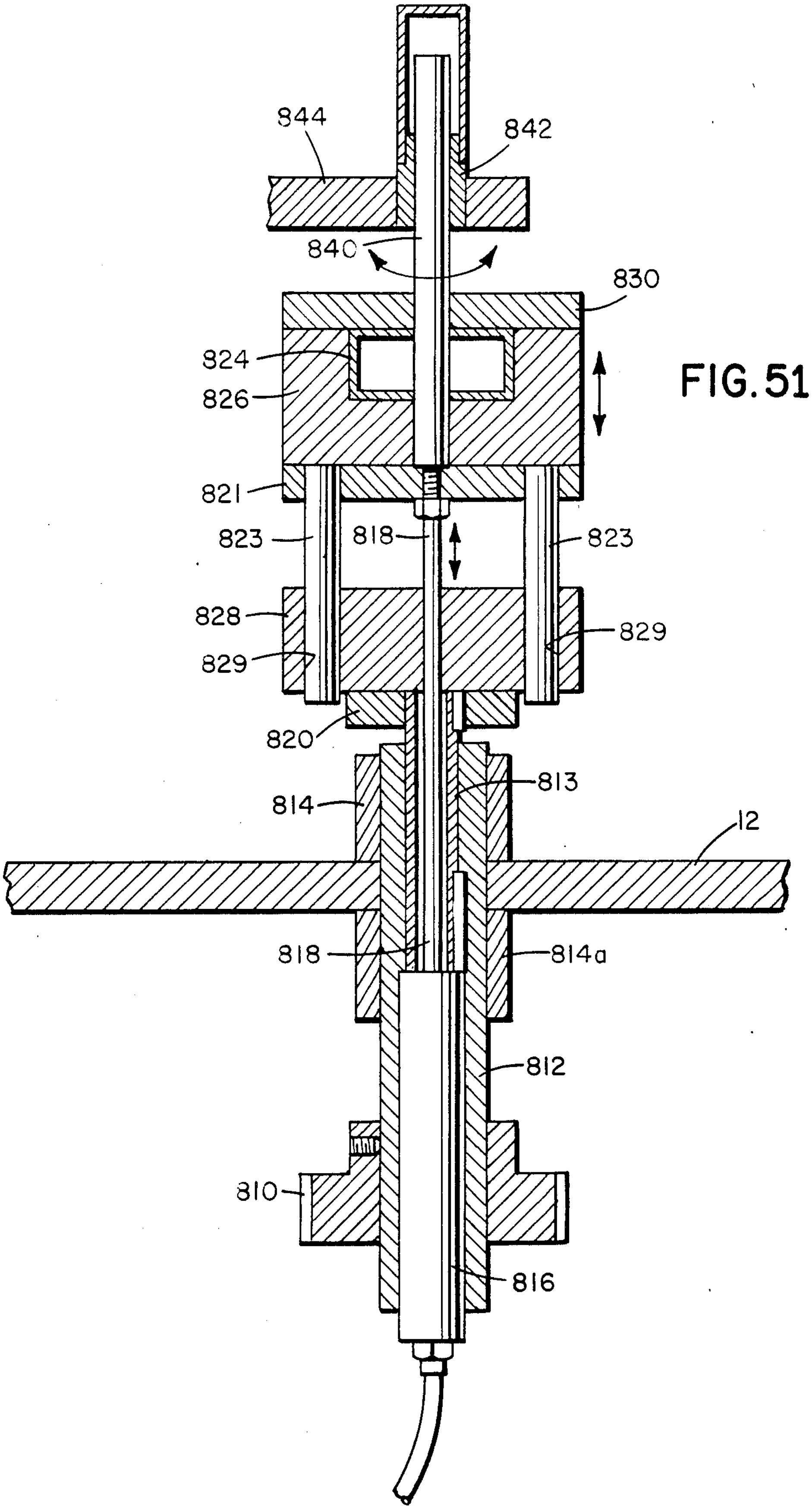
FIG. 51 is a sectional view taken on line 51—51 of FIG. 50.
Figure 52:
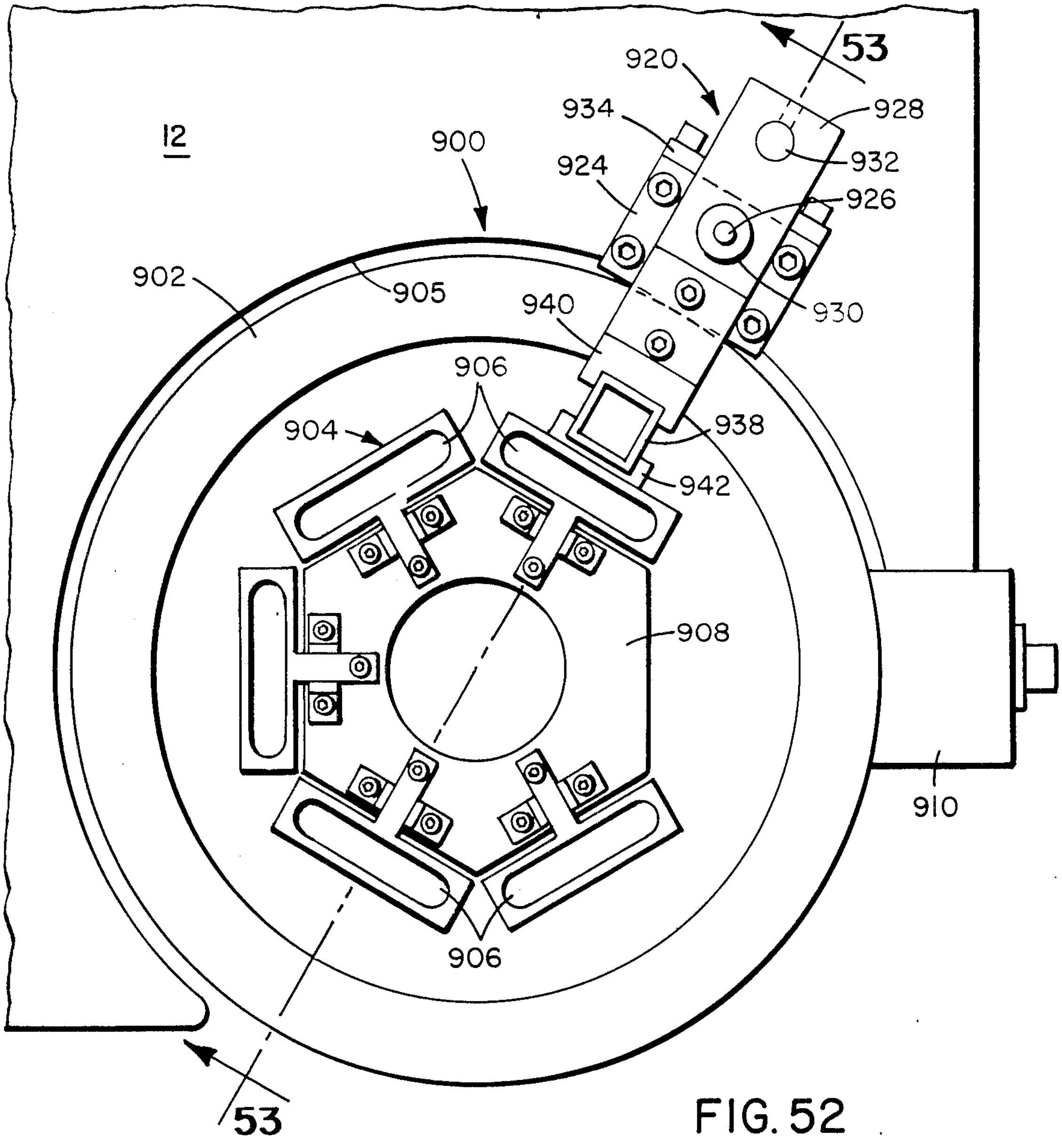
FIG. 52 is a top plan view of the glue pot of the present invention.

A pneumatic cylinder 816 is fixed within pivot shaft 812. Cylinder 816 actuates a vertical piston rod 818 extending through a spring support plate 820 to a mounting plate 821 fixed to glue arm mounting block 826. Spring support plate 820 supports a cylindrical spring 822 fixed between plate 820 and the horizontally extending glue arm 824. A guide block 828, mounted on spring support plate 820, guides piston rod 818. Plate 820 is supported by and keyed to the top end of a tubular shaft 813 which is coaxial with and keyed inside the pivot shaft 812, as seen in FIG. 51. Therefore, when piston 806 is activated, reciprocal motion of rack 808 is translated to circular motion and pivot shaft 812, shaft 813, plate 820 and guide block 828 are rotated through an angle of about 180°.

Glue arm 824 is clamped in a mounting block 826 attached to mounting plate 821, which, in turn, is attached to the top end of piston rod 818. A plate 830 clamps glue arm 824 in mounting block 826.

Two vertical guide rods 823 are secured in plate 821, equispaced on opposite sides of piston rod 818, and extend downwardly through bores 829 in block 828. Thus, rotary motion is transmitted from block 828 to block 826 and arm 824.

A vertical shaft 340, secured in block 826 and coaxial with shaft 813, extends upwardly through a bearing 342 in a plate 344 which is parallel to table 12 and is supported by vertical plates 346 attached to the table.

A glue applicator 832 is fixed to the bottom side of glue arm 824 at its outer end. Glue applicator 832 includes glue pins 834 which apply glue to polyhedron blank 20. Glue pins 834 are arranged on the underside of applicator 832 in the precise pattern in which glue is to be supplied to blank 20, as shown by glue dots 40 in FIG. 43. Glue pins 834 are heated by electric coils (not shown) inside applicator 832.

In operation, glue arm 824 is pivoted by pivot shafts 812, 813 to a position above glue pot 900. As piston 818 is retracted against the force of springs 822, glue pins 834 are dipped into glue troughs 906 and receive a supply of glue to be applied to polyhedron blank 20. As pneumatic pressure in cylinder 816 is released, springs 822 return glue applicator 832 and pins 834 to their normal position and glue arm is pivoted from glue pot 900 to forming assembly 300. Piston 818 is again retracted so that glue pins 834 contact and apply glue to blank 20.

GLUE POT

Glue pot 900 comprises a pot or container 902 in which a supply of adhesive is maintained. Container 902 is supported by a frame member 907 in a circular notch 905 cut in table 12. Any adhesive which is quick setting is acceptable, although a hot glue adhesive is preferred. Heating elements 903 maintain the glue at the desired temperature.

Figure 53:
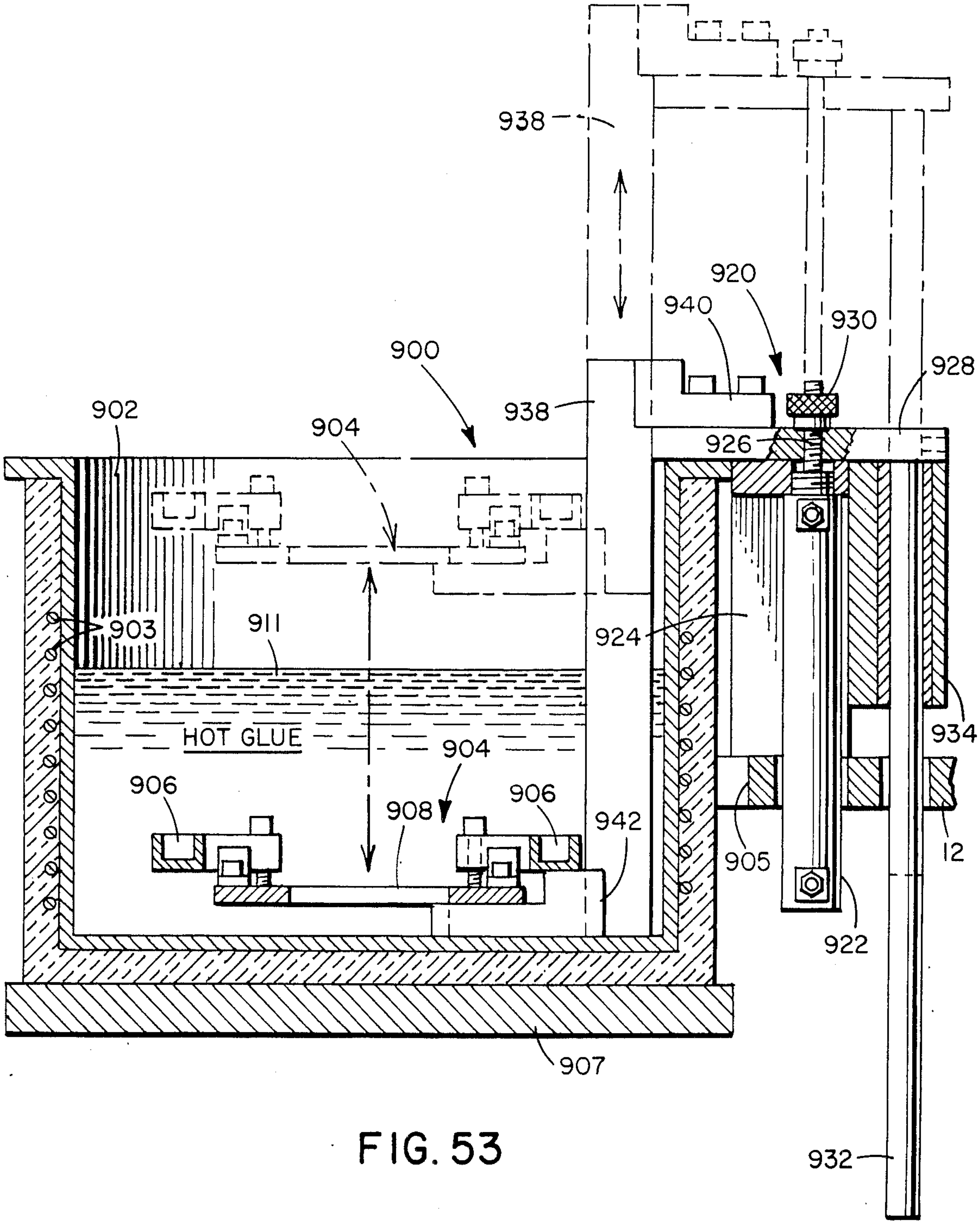
FIG. 53 is a sectional view taken along line 53—53 of FIG. 52.

A glue trough assembly 904 is supported and moved vertically up and down as shown in FIG. 53 by an assembly generally indicated at 920. Assembly 920 consists of a pneumatic cylinder 322 mounted vertically in a bracket 924 attached to table 12. Piston rod 926 is attached to a horizontal plate 928 with an adjustable lock nut 930. A vertically disposed guide rod 932 is attached to plate 928 and slides in a bearing 934 attached to bracket 924.

A vertically disposed bar 938 is attached to plate 928 by an L-shaped bracket 940. Bar 938 extends downwardly inside the glue pot, and the lower end is attached to glue trough plate 908 by an L-shaped bracket 942.

Trough assembly 904 includes a plurality of troughs 906 fixed to the support plate 908. As the vertically extending piston 922 is retracted, trough assembly 904 is lowered into glue 911. Troughs 906 fill with glue and the piston rod is then extended raising through assembly 904 to a level sufficiently high within insulated container 902 so that when glue arm 824 is pulled downwardly, pins 834 will dip into troughs 906. Troughs 906 are arranged in a pattern to coordinate with the pattern of pins 834 on applicator 832.

OPERATION

The operation of the polyhedron assembling machine according to the present invention will now be described with particular reference to the timing sequence chart shown in FIG. 54. On this chart, the operating control mechanism, which consists of a drive motor driving a plurality of rotating cam elements activating microswitches for individual operations, (which are not shown, but are well known in the art.) is defined on a scale from zero to 100 which corresponds to the full 360° rotation of each cam element. Thus, in FIG. 54, zero represents the starting position, 50 represents a position 180° from the starting position, and 100 represents a complete rotation. The bars in FIG. 54 represent the periods during the sequence when the noted operations are activated.

In operation, a supply of polyhedron blanks is loaded into magazine 100. Vacuum is supplied to placement head 200 which picks up an individual polyhedron blank from the supply in magazine 100 and places it on forming assembly or forming head (F.H.) 300. Three of flap pusher assemblies 332 for each wing are then activated to push flaps 21–26 up and bend the flaps about score lines 43*a* and 44*a*. The six lower flap fold-down fingers 244 are then activated to push these folded flaps back against top face 324, 326 of wing plates 302, 304, respectively. Tab folding assemblies 354 are then actuated to fold tabs 33–36 and hold them in their folded position. Next, the two remaining flap pusher assemblies for each wing are actuated to bend the remaining four flaps 27–30 along their respective score lines 43*a* and 44*a*. Upper flap fold-down fingers 242 are then actuated to push back these four flaps against top faces 324 and 326. The remaining tab folding assemblies 354 are actuated to fold tabs 37–39 and hold the tabs in their folded position. Vacuum is then supplied to the forming assembly to retain the polyhedron blank on the forming assembly.

During the flap folding and tab bending operation, the rubber band conveyor and rubber band inserter are operating as shown on the sequence chart in FIG. 53. Rubber band conveyor operates so that a rubber band is at the end of the conveyor ready to be picked up by the rubber band inserter. The rubber band inserter extends to the conveyor and picks up a rubber band by extending its fingers to the open position. The inserter is then retracted with the fingers still open. Next, the inserter pivots toward the forming assembly. The inserter is then extended again and the rubber band is inserted on hooks 41 of polyhedron blank 20. The fingers then close and the inserter is again retracted and pivots toward the rubber band converyor.

Glue head 800 rotates from the glue pot to the forming assembly and applies glue to glue receiving tabs 36 and 39 and to flaps 24, 25 and 30, as shown in FIG. 43. Wing plates 302 and 304 of forming assembly 300 are then activated to fold polyhedron blank into its assembled configuration. The wing plates are fully closed only momentarily as shown in FIG. 29 to allow glue 40 to set. As wings 302 and 304 are opened, the assembled polyhedron is biased into its opened position by rubber band 602 and an air jet (not shown) ejects the polyhedron from the forming assembly and blows it into discharge chute 18. The cycle then is restarted.

Although a preferred embodiment of the invention has been described, the invention is not limited thereby. Various modifications will be obvious to those of ordinary skill in the art, and the invention is defined only by the following claims.

We claim:

1. A polyhedron assembling machine comprising:

lifting means for lifting a polyhedron blank from a supply stack;

forming means for receiving a polyhedron blank from said lifting means and for forming a polyhedron blank into a polyhedron; and resilient member inserter means for inserting a resilient member into a polyhedron blank on said forming means and for attaching the resilient member in tension to the polyhedron blank so that the inherent nature of the resilient member to return to its state of equilibrium will bias the polyhedron blank into its formed configuration.

2. A polyhedron assembling machine as claimed in claim 1 further comprising adhesive applying means for applying adhesive to a polyhedron blank in said forming means.

3. A polyhedron assembling machine as claimed in claim 1 further comprising polyhedron blank holder means for holding a supply stack of polyhedron blanks to be lifted by said lifting means.

4. A polyhedron assembling machine as claimed in claim 1 further comprising resilient member conveyor means for conveying a supply of resilient members to said resilient member inserter means.

5. A polyhedron assembling machine as recited in claim 1 wherein said lifting means and said forming means further comprise pre-bending means for pre-bending the polyhedron blanks along score lines of a polyhedron blank.

6. A polyhedron assembling machine as recited in claim 5 wherein said lifting means comprises a pneumatically actuated pick-up head.

7. A polyhedron assembling machine comprising:

lifting means for lifting a polyhedron blank from a supply stack, said lifting means comprising a pneumatically actuated pick-up head fixed to a hinge rod by a connecting arm rotatably attached to each end of said pick-up head so that said pick-up head can rotate relative to said hinge rod and relative to said connecting arms forming means for receiving a polyhedron blank from said lifting means and for forming a polyhedron blank into a polyhedron; and resilient member inserter means for inserting a resilient member into a polyhedron blank on said forming means, and for attaching the resilient member in tension to the polyhedron blank so that the inherent nature of the resilient member to return to its state of equilibrium will bias the polyhedron blank into its formed configuration 8. A polyhedron assembling machine is recited in claim 7 wherein a cam follower is attached to one end of said pick-up head, said cam follower engaging a cam track which defines the rotational movement of said pick-up head.

9. A polyhedron assembling machine as recited in claim 5 wherein said pre-bending means in both said lifting means and said forming means comprises a plurality of fingers.

10. A polyhedron assembling machine as recited in claim 1 wherein said forming means comprises a plurality of wing plates hingedly connected, said plates being rotatable about said hinged connection so that a polyhedron blank placed on said plates is formed into a polyhedron when said plates are rotated about said hinged connection.

11. A polyhedron assembling machine as recited in claim 10 wherein said forming means comprises two wing plates, and said hinged connection allowing said plates to be rotated into contiguous configurations.

12. A polyhedron asembling machine as recited in claim 10 wherein said forming means further comprises retaining means for retaining a polyhedron blank in place.

13. A polyhedron assembling machine as recited in claim 12 wherein said retaining means comprises a suction element.

14. A polyhedron assembling machine as recited in claim 11 wherein said wing plates are actuated to rotate about said hinged connection by a plurality of connecting arms.

15. A polyhedron assembling machine as recited in claim 14 wherein at least one of said connecting arms engages a cam track.

16. A polyhedron assembling machine as recited in claim 15 wherein said connecting arms are pneumatically operated.

17. A polyhedron assembling machine as recited in claim 1 wherein said resilient member inserter means comprises a rotatable body, a longitudinally extendable arm extending from said rotatable body and rotatable therewith, and two laterally moveable arms attached to said longitudinally extendable arm whereby said laterally moveable arms may receive a resilient member and insert it onto a polyhedron blank on said forming means.

18. A polyhedron assembling machine as recited in claim 2 wherein said adhesive applying means comprises an adhesive applicator for applying adhesive to a polyhedron blank in said forming means and an adhesive reservoir for supplying adhesive to said adhesive applicator.

19. A polyhedron assembling machine as recited in claim 18 wherein said adhesive applicator has a plurality of adhesive applyng elements which receive adhesive from said adhesive reservoir and apply adhesive to a polyhedron blank.

20. A polyhedron assembling machine as recited in claim 19 wherein said adhesive reservoir further comprises a plurality of moveable adhesive troughs which receive adhesive from said adhesive reservoir, and wherein said adhesive applying elements dip into said troughs to receive a supply of adhesive.

21. A polyhedron assembling machine as recited in claim 20 wherein said adhesive applicator is rotatable and rotates between said adhesive reservoir and said forming means.

22. A polyhedron assembling machine as recited in claim 3 wherein said polyhedron blank holder means comprises tracks and a base member for holding a supply stack of polyhedron blanks, said base member having a central aperture through which said lifting means withdraws a polyhedron blank from the supply stack of polyhedron blanks.

23. A polyhedron assembling machine as recited in claim 4 wherein said resilient member conveyor means comprises spaced conveyor belts for conveying a resilient member.

24. A polyhedron assembling machine comprising:

polyhedron blank holder means for holding a supply stack of polyhedron blanks;

lifting means for lifting a polyhedron blank from said polyhedron blank holder means;

forming means for receiving a polyhedron blank from said lifting means and for forming a polyhedron blank into a polyhedron;

resilient member conveyor means for conveying a supply of resilient members to be inserted into a polyhedron blank on said forming means;

resilient member inserter means for receiving a resilient member from said resilient member conveyor means, for inserting a resilient member onto a polyhedron blank on said forming means, and for attaching the resilient member in tension to the polyhedron blank so that the inherent nature of the resilient member to return to its state of equilibrium will bias the polyhedron blank into its formed configuration; and adhesive applying means for applying adhesive to a polyhedron blank in said forming means.

25. A polyhedron assembling machine as recited in claim 24 wherein both said lifting means and said forming means further comprise pre-bending means for pre-bending the polyhedron blanks along score lines of the polyhedron blank;

said polyhedron blank holder means comprises tracks and a base member for holding a supply stack of polyhedron blanks, said base member having a central aperture through which said lifting means withdraws a polyhedron blank from the supply stack of polyhedron blanks;

said lifting means comprises a pneumatically actuated pick-up head fixed to a hinge rod by a connecting arm rotatably attached to each end of said pick-up head so that said pick-up head can rotate relative to said hinge rod and relative to said connecting arm;

said pre-bending means in both said lifting means and said forming means comprises a plurality of fingers;

said forming means comprises a plurality of plates hingedly connected, said plates being rotatable about said hinged connection so that a polyhedron blank placed on said plates is formed into a polyhedron when said plates are rotated about said hinged connection;

said resilient member conveyor means comprises spaced conveyor belts for conveying a resilient member;

said resilient member inserter means comprises a rotatable body, a longitudinally extendable arm extending from said rotatable body and rotatable therewith, and two laterally moveable arms attached to said longitudinally extendable arms whereby said laterally moveable arms may receive a resilient member and insert it onto a polyhedron blank on said forming means; and said adhesive applying means comprises an adhesive applicator for applying adhesive to a polyhedron blank on said forming means and an adhesive reservoir for supplying adhesive to said adhesive applicator.

26. A polyhedron assembling machine as recited in claim 25 wherein a cam follower is attached to one end of said pick-up head, said cam follower engaging a cam track which defines the rotational movement of said pick-up head;

said forming means comprises retaining means for retaining a polyhedron blank in place during the forming process;

said plates are actuated to rotate about said hinged connection by a plurality of connecting arms, wherein at least one of said connecting arms engages a cam track; and said adhesive applicator has a plurality of adhesive applying elements which receive adhesive from said adhesive reservoir and apply adhesive to a polyhedron blank, said adhesive reservoir further comprises a plurality of moveable adhesive troughs which receive adhesive from said adhesive reservoir, and said adhesive applying elements dip into said troughs.

27. A method of making a collapsible polyhedron comprising the steps of:

placing a flat polyhedron blank on a hinged forming fixture;

inserting a resilient member into the polyhedron blank and attaching the resilient member in tension to the polyhedron blank so that the inherent nature of the resilient member to return to its state of equilibrium will serve to bias the polyhedron into its formed configuration; and folding the polyhedron blank by blending the forming fixture along its hinged connection to form the flat polyhedron blank into its formed polyhedron configuration.

28. A method as recited in claim 27 further comprising the step of applying adhesive to the polyhedron blank so that one part of the polyhedron blank will be adhesively connected to another part of the polyhedron blank.

29. A method as recited in claim 27 further comprising the step of conveying a resilient member to a resilient member inserter means for inserting a resilient member into the polyhedron blank and for attaching the resilient member in tension to the polyhedron blank.

30. A method as recited in claim 27 further comprising the step of pre-bending portions of the polyhydron blank along score lines prior to the step of folding the polyhedron blank to form the blank into its formed polyhedron configuration.

31. A method as recited in claim 27 wherein the step of placing a flat polyhedron blank on a forming fixture further comprises the step of first lifting with a pick-up head a polyhedron blank from a supply stack of polyhedron blanks.

32. A method as recited in claim 31 wherein the step of prebending further comprises the steps of bending a flap of the polyhedron blank in a first direction; bending the element back to its original position;

folding a tab on the polyheron blank; and holding the tab in the folded position.

33. A method of making a collapsible polyhedron comprising the steps of:

placing a flat polyhedron blank on a forming fixture having a hinged connection;

pre-bending portions of the polyhedron blank along score lines;

applying adhesive to the polyhedron blank so that one part of the polyhedron blank will be adhesively connected to another part of the polyhedron blank;

conveying a resilient member to a resilient member inserting means;

inserting a resilient member into the polyhedron blank and attaching the resilient member in tension so that the inherent nature of the resilient member to return to its state of equilibrium will serve to bias the polyhedron into its formed configuration; and folding the polyhedron blank by bending the forming fixture along its hinged connection to form the flat polyhedron blank into its formed polyhedron configuration.

34. A method as recited in claim 33 wherein the step of placing a flat polyhedron blank on a forming fixture further comprises the step of first lifting with a pick-up head a polyhedron blank from a supply stack of polyhedron blanks.

35. A method as recited in claim 33 wherein the step of prebending further comprises the steps of bending a flap of the polyhedron blank in a first direction and bending the flap back to its original position;

folding a tab on the periphery of the flap; and holding the tab in the folded position.

* * * * *